United States Patent [19]
Tanaka et al.

[11] Patent Number: 5,216,516
[45] Date of Patent: Jun. 1, 1993

[54] ORTHOGONAL TRANSFORMATION ARITHMETIC UNIT

[75] Inventors: Masafumi Tanaka, Osaka; Yukihiro Imai, Kawanishi; Kazuo Sakamoto, Kobe; Tatsuya Fujii, Nishinomiya, all of Japan

[73] Assignee: Ricoh Company, Inc., Tokyo, Japan

[21] Appl. No.: 687,037

[22] Filed: Apr. 16, 1991

[30] Foreign Application Priority Data

| Apr. 27, 1990 | [JP] | Japan | 2-113156 |
| Jun. 8, 1990 | [JP] | Japan | 2-151178 |
| Jun. 22, 1990 | [JP] | Japan | 2-164794 |
| Jun. 29, 1990 | [JP] | Japan | 2-173819 |
| Jun. 29, 1990 | [JP] | Japan | 2-173820 |
| Mar. 7, 1991 | [JP] | Japan | 3-041771 |

[51] Int. Cl.$^5$ ............................................. H04N 1/415
[52] U.S. Cl. ................................. 358/426; 358/261.3; 358/261.4
[58] Field of Search ..................... 382/56, 41; 358/426–427, 261.1–261.4, 432

[56] References Cited

U.S. PATENT DOCUMENTS

| 4,302,775 | 11/1981 | Widergren et al. | 382/56 |
| 4,394,774 | 7/1983 | Widergren et al. | 382/56 |
| 4,774,587 | 9/1988 | Schmitt | 358/426 |
| 4,982,282 | 1/1991 | Saito et al. | 358/261.3 |
| 4,999,715 | 3/1991 | Porcellio et al. | 358/261.4 |
| 5,021,891 | 6/1991 | Lee | 358/432 |
| 5,107,345 | 4/1992 | Lee | 358/261.1 |

Primary Examiner—Stephen Brinch
Attorney, Agent, or Firm—Cooper & Dunham

[57] ABSTRACT

An orthogonal transformation arithmetic unit performs a discrete cosine transformation with respect to a digital signal and compresses discrete cosine transformed data by quantizing and Huffman-coding processings thereof. The arithmetic unit Huffman-decodes the compressed data and demodulates the Huffman-decoded data to a digital signal by performing inverse quantization and an inverse discrete cosine transformation with respect to the Huffman-decoded data. The arithmetic unit has a memory section for storing one line block of image data of brightness and color signals converted to digital signals; and a section for processing the discrete cosine transformation and having a preprocessing circuit for performing adding and subtracting operations with respect to the image data read out of the memory section such that some values of discrete cosine transformation coefficients used in the discrete cosine transformation are partially set to zero. The other orthogonal arithmetic units are also shown.

8 Claims, 22 Drawing Sheets

Fig. 4

BEFORE DCT-PROCESSING — ONE BLOCK

| $X_{00}$ | $X_{01}$ | ... | | | | | $X_{07}$ |
|---|---|---|---|---|---|---|---|
| $X_{10}$ | $X_{11}$ | ... | | | | | $X_{17}$ |
| $X_{20}$ | $X_{21}$ | ... | | | | | $X_{27}$ |
| $X_{30}$ | $X_{31}$ | ... | | | | | $X_{37}$ |
| $X_{40}$ | $X_{41}$ | ... | | | | | $X_{47}$ |
| $X_{50}$ | $X_{51}$ | ... | | | | | $X_{57}$ |
| $X_{60}$ | $X_{61}$ | ... | | | | | $X_{67}$ |
| $X_{70}$ | $X_{71}$ | ... | | | | | $X_{77}$ |

Fig. 5

AFTER DCT-PROCESSING — ONE BLOCK

| 8 | ... | 4 | 3 | 2 | 1 | |
|---|---|---|---|---|---|---|
| $Z_{07}$ | ... | | | $Z_{01}$ | $Z_{00}$ | VIII |
| $Z_{17}$ | ... | | | $Z_{11}$ | $Z_{10}$ | |
| $Z_{27}$ | ... | | | $Z_{21}$ | $Z_{20}$ | |
| $Z_{37}$ | ... | | | $Z_{31}$ | $Z_{30}$ | |
| $Z_{47}$ | ... | | | $Z_{41}$ | $Z_{40}$ | |
| $Z_{57}$ | ... | | | $Z_{51}$ | $Z_{50}$ | |
| $Z_{67}$ | ... | | | $Z_{61}$ | $Z_{60}$ | II |
| $Z_{77}$ | ... | | | $Z_{71}$ | $Z_{70}$ | I |

480 PICTURE ELEMENTS (60 BLOCKS)

720 PICTURE ELEMENTS (90 BLOCKS)

b ⟶ HIGH FREQUENCY COMPONENT

↓ HIGH FREQUENCY COMPONENT

| 272.2 | -14.3 | 5.4 | 3.7 | -1.2 | 1.8 | 0.5 | 1.3 |
|---|---|---|---|---|---|---|---|
| 10.3 | 4.0 | -2.6 | -1.5 | 0.8 | 0.4 | 0.2 | 0.1 |
| -5.6 | 2.9 | 1.6 | 1.0 | 0.6 | -0.3 | 0.2 | 0.1 |
| 3.5 | 1.7 | -1.1 | 0.8 | 0.5 | 0.2 | 0.1 | -0.1 |
| -2.0 | 1.1 | 0.8 | 0.6 | 0.4 | 0.2 | 0.1 | 0.1 |
| 1.1 | 0.8 | 0.7 | 0.6 | 0.4 | -0.2 | -0.1 | 0.1 |
| 0.7 | -0.7 | 0.7 | -0.6 | 0.4 | 0.2 | 0.1 | 0.1 |
| 0.7 | 0.6 | 0.6 | 0.6 | 0.4 | 0.2 | 0.1 | 0.1 |

QUANTIZING COEFFICIENTS
c
( 16, 11, 10, 16, 24, 40, 51, 61)
( 12, 12, 14, 19, 26, 58, 60, 55)
( 14, 13, 16, 24, 40, 57, 69, 56)
( 14, 17, 22, 29, 51, 87, 80, 62)
( 18, 22, 37, 56, 68,109,103, 77)
( 24, 35, 55, 64, 81,104,113, 92)
( 49, 64, 78, 87,103,121,120,101)
( 72, 92, 95, 98,112,100,103, 99)

ZERO BOUNDARY REGION $$\begin{bmatrix} 136 & -10 & 4 & 2 & 0 & 0 & 0 & 0 \\ 7 & 3 & -1 & -1 & 0 & 0 & 0 & 0 \\ -3 & 2 & 1 & 0 & 0 & 0 & 0 & 0 \\ 2 & 1 & 0 & 0 & 0 & 0 & 0 & 0 \\ -1 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix}$$

d
e

ORTHOGONAL TRANSFORMATION ARITHMETIC UNIT

BACKGROUND OF THE INVENTION

1. Field of the Invention

The present invention relates to an arithmetic unit used in e.g., a digital still camera, a facsimile telegraph, a color copying machine, a visual telephone, etc. and performing an orthogonal transformation such as a discrete cosine transformation (called a DCT or a DCT-transformation in the following description) and a discrete sine transformation (called a DST or a DST-transformation in the following description) for compressing and extending a color image.

2. Description of the Related Art

Various kinds of systems for coding a color still image are generally searched and developed. The adoption of an adaptive discrete cosine transformation (called an ADCT or simply a DCT in the following description) was determined as an international standard of the above coding systems by Joint Photographic Export Group (called JPEG in the following description) in October, 1989. A processing of this adaptive discrete cosine transformation will next be schematically described.

In DCT-processing and IDCT-processing, it is necessary to perform 64 multiplying operations with respect to all input data and DCT-processing coefficients composed of an (8×8) matrix, and perform 56 adding operations with respect to the multiplied results. Accordingly, a processing time required to perform ADCT-processing including a memory operation with respect to a memory is longer than a processing time from a charge coupled device to one of page buffers. Therefore, it is necessary to dispose a memory for temporarily storing color and brightness information of one photographed image picture, circuit elements corresponding to the respective page buffers, and a frame memory. For example, in a still video camera, it is necessary to dispose a memory having a capacity of 7.5M bits with respect to one picture. Accordingly, there is a problem that the size of a circuit structure of the entire orthogonal transformation arithmetic unit is increased.

When an image is generally coded and coded data are reproduced as an original image, there is a case in which the size of an image obtained by the coded data is reduced or enlarged in comparison with the original image. In such reducing and enlarging processings, inverse orthogonal transformation processing is performed with respect to orthogonally transformed data and these data are reproduced as the original image. Thereafter, the reducing and enlarging processings are performed with respect to the reproduced data. When the image is reproduced and the reducing and enlarging processings are further performed with respect to the reproduced image, it is necessary to separately dispose a processing unit for performing the reducing and enlarging processings. Further, there is a problem that a processing time is further increased by separately disposing such a processing unit for performing the reducing and enlarging processings.

Further, the general orthogonal transformation arithmetic unit for performing DCT-processing and inverse DCT-processing has a DCT-processing section and an inverse DCT-processing section. Two main arithmetic circuits similarly operated, etc. are disposed in the DCT-processing section and the inverse DCT-processing section. An area for these main arithmetic circuits amounts to about 90 percent of an area for a semiconductor circuit chip constituting a DCT/inverse DCT processor. Therefore, the size of a circuit structure is increased by these two main arithmetic circuits.

Accordingly, the circuit structure is large-sized in the general orthogonal transformation arithmetic unit for performing the DCT/inverse DCT-processings.

To change data compressibility, it is sufficient to change the number of nonzero values with respect to quantized image component data. Namely, it is sufficient to move a zero boundary region having only quantized value zero and change a quantizing coefficient $\alpha$.

When the quantizing coefficient $\alpha$ is set to a value close to zero, the quality of a reproduced image is improved, but the amount of image data is correspondingly increased, thereby reducing the data compressibility. The reduction of the data compressibility means that the data compressibility is bad and close to one. In contrast to this, when the quantizing coefficient $\alpha$ is close to one, the quality of a reproduced image is reduced, but the data compressibility is improved. Thus, it is possible to determine superiority or inferiority of the quality of the reproduced image by changing the quantizing coefficient $\alpha$. When the data compressibility is reduced, the number of sheets of still images stored to one memory medium is reduced although the image quality is improved. In contrast to this, when the data compressibility is increased, the number of sheets of images stored to the memory medium can be increased although the image quality is reduced.

The above description relates to one image block within one image. When the above-mentioned processing is performed with respect to the one image, the above-mentioned operations are performed with respect to 5400 image blocks constituting the one image.

The above description relates to a process for storing a photographed image to the memory medium. A reproduced image with respect to such a stored image can be obtained by a process completely reverse to the image storing process.

In a general apparatus for compressing and extending a color image by using the DCT-processing, there is no orthogonal transformation arithmetic unit having the relation between the quantizing coefficient $\alpha$, the image quality and the number of sheets of stored images.

SUMMARY OF THE INVENTION

It is therefore a first object of the present invention to provide an orthogonal transformation arithmetic unit having a small-sized circuit structure.

A second object of the present invention is to provide an orthogonal transformation arithmetic unit in which the reducing and enlarging processings of an image are simultaneously executed in an inverse orthogonal transformation circuit for reproducing orthogonally transformed data as an original image instead of a separate unit for performing the reducing and enlarging processings so that no unit for reduction and enlargement is required and a processing time for reduction and enlargement can be reduced.

A third object of the present invention is to provide an orthogonal transformation arithmetic unit having a small-sized circuit structure and performing DCT-processing or DCT/inverse DCT-processings.

A fourth object of the present invention is to provide an orthogonal transformation arithmetic unit in which a quantizing coefficient a can be changed by setting the number of sheets of images stored to a recording medium so that the quality of an image stored to the memory medium is changed.

In accordance with a first structure of the present invention, the above objects can be achieved by an orthogonal transformation arithmetic unit for performing a discrete cosine transformation with respect to a digital signal and compressing discrete cosine transformed data by quantizing and Huffman-coding processings thereof, the orthogonal transformation arithmetic unit in Huffman-coding the compressed data and demodulating the Huffman-decoded data to a digital signal by performing inverse quantization and an inverse discrete cosine transformation with respect to the Huffman-decoded data, the orthogonal transformation arithmetic unit comprising a memory section for storing one line block of image data of brightness and color signals converted to digital signals; and a section for processing the discrete cosine transformation and having a preprocessing circuit for performing adding and subtracting operations with respect to the image data read out of the memory section such that some values of discrete cosine transformation coefficients used in the discrete cosine transformation are partially set to zero.

In such a first structure, the discrete cosine transformation processing section performs the discrete cosine transformation with respect to data obtained by performing the adding and subtracting operations about digitally converted data of the brightness and color signals supplied from the memory section. Thus, it is possible to partially set some values of the discrete cosine transformation coefficient used in the discrete cosine transformation to zero. Accordingly, the discrete cosine transformation processing section can reduce the number of operations required to perform the discrete cosine transformation, thereby reducing a time required to perform the discrete cosine transformation.

Since the time required to process the discrete cosine transformation is reduced, it is not necessary for the memory section to store all information of one photographed image. Accordingly, with respect to the photographed image composed of 60 blocks, it is sufficient for the memory section to store image data constructed by a total of 180 blocks composed of 90 blocks extending in a horizontal direction of the photographed image with respect to two blocks in a vertical direction thereof. Namely, it is sufficient to dispose two memory sections for storing one line block of image data, thereby reducing the size of a circuit structure of the memory section. Thus, the size of a circuit structure of the entire orthogonal transformation arithmetic unit is reduced by the memory section and the discrete cosine transformation processing section.

In accordance with a second structure of the present invention, the above objects can be achieved by an orthogonal transformation arithmetic unit for dividing one image into blocks including a plurality of picture elements, the orthogonal transformation arithmetic unit comprising an orthogonal transformation circuit for performing orthogonal transformation processing with respect to each of the blocks; and an inverse orthogonal transformation circuit for returning orthogonally transformed data to original image data; the inverse orthogonal transformation circuit having a processing block having a variable size and selecting an inverse orthogonal transformation coefficient corresponding to a designated size of the processing block, the inverse orthogonal transformation circuit performing inverse orthogonal transformation processing with respect to the designated size of the processing block.

In the second structure of the present invention, the reducing and enlarging processings of an image are simultaneously executed in the inverse orthogonal transformation circuit for reproducing orthogonally transformed data as an original image instead of a separate unit for performing the reducing and enlarging processings. Accordingly, no unit for reduction and enlargement is required and a processing time for reduction and enlargement can be reduced.

In accordance with a third structure of the present invention, the above objects can be achieved by an orthogonal transformation arithmetic unit for performing a discrete cosine transformation with respect to a digital signal and compressing discrete cosine transformed data by quantizing and Huffman-coding processings thereof, the orthogonal transformation arithmetic unit Huffman-decoding the compressed data and demodulating the Huffman-decoded data to a digital signal by performing inverse quantization and an inverse discrete cosine transformation with respect to the Huffman-decoded data, the orthogonal transformation arithmetic unit having a discrete cosine transformation-/inverse discrete cosine transformation processing section for processing the discrete cosine transformation and the inverse discrete cosine transformation; the discrete cosine transformation/inverse discrete cosine transformation processing section comprising a coefficient memory section for storing coefficients required to perform the discrete cosine transformation and the inverse discrete cosine transformation and transmitting one of the coefficients selected in accordance with a control signal indicative of the discrete cosine transformation or the inverse discrete cosine transformation; a set of main arithmetic circuits for processing both the discrete cosine transformation and the inverse discrete cosine transformation by the transmitted coefficient and commonly used in both the processings of the discrete cosine transformation and the inverse discrete cosine transformation; and a section for selecting discrete cosine transformed data or inverse discrete cosine transformed data in accordance with the control signal.

In such a third structure, the DCT/inverse DCT-processing section can commonly execute both the DCT-processing and the inverse DCT-processing by one set of main processing circuits. The selecting section selects one of the DCT-transformed data and the inverse DCT-transformed data in accordance with the control signal transmitted thereto. Thus, a DCT-processing circuit and an inverse DCT-processing circuit separately disposed in the general orthogonal transformation arithmetic unit are unified as the DCT/inverse DCT-processing section, thereby reducing the size of a circuit structure of the entire orthogonal transformation arithmetic unit.

In accordance with a fourth structure of the present invention, the above objects can be achieved by an orthogonal transformation arithmetic unit of an adaptive discrete cosine transformation coding system for performing an orthogonal transformation with respect to information of a color still image using a discrete cosine transformation, the orthogonal transformation arithmetic unit comprising: a change-over switch for setting the number of sheets of a photographed image storable to a memory section having a constant memory capacity; a compressibility detecting section for automatically setting a quantizing coefficient used to compress an information amount of the photographed image until a predetermined image information amount in accordance with a signal indicative of the number of sheets of the photographed image transmitted from the change-over switch, the compressibility detecting section calculating a compressibility of the information amount and predicting a quality level of the stored photographed image based on the compressibility; and a display section for visually displaying a signal indicative of the image quality level transmitted from the compressibility detecting section.

In such a fourth structure, the compressibility detecting section arbitrarily sets a quantizing coefficient $\alpha$ such that information of the number of sheets of the photographed image manually set by the change-over switch is stored to the memory section. The quantizing coefficient $\alpha$ can be changed by the number of sheets of the photographed image set by an operator. When the quantizing coefficient $\alpha$ is changed, a zero boundary region is moved as mentioned above so that a quality of the stored photographed image can be changed. The compressibility detecting section calculates a compressibility based on the quantizing coefficient $\alpha$ and predicts an image quality level based on this compressibility. The display section visually displays this predicted image quality level. Accordingly, the operator can confirm the quality of the photographed image with respect to the set number of sheets thereof.

As mentioned above, the change-over switch, the compressibility detecting section and the display section indirectly change the quantizing coefficient $\alpha$ by setting the number of sheets of the stored image so as to set the quality of the stored photographed image.

Further objects and advantages of the present invention will be apparent from the following description of the preferred embodiments of the present invention as illustrated in the accompanying drawings.

BRIEF DESCRIPTION OF THE DRAWINGS

FIG. 4 is a view showing one data block before the DCT-processing;

FIG. 5 is a view showing one data block after the DCT-processing;

FIG. 8 is a view showing values of a quantizing coefficient $\alpha$ used in quantization;

FIG. 9 is a view showing a concrete example of quantized image component data;

DESCRIPTION OF THE PREFERRED EMBODIMENTS

The preferred embodiments of an orthogonal transformation arithmetic unit in the present invention will next be described in detail with reference to the accompanying drawings.

Figure 1:
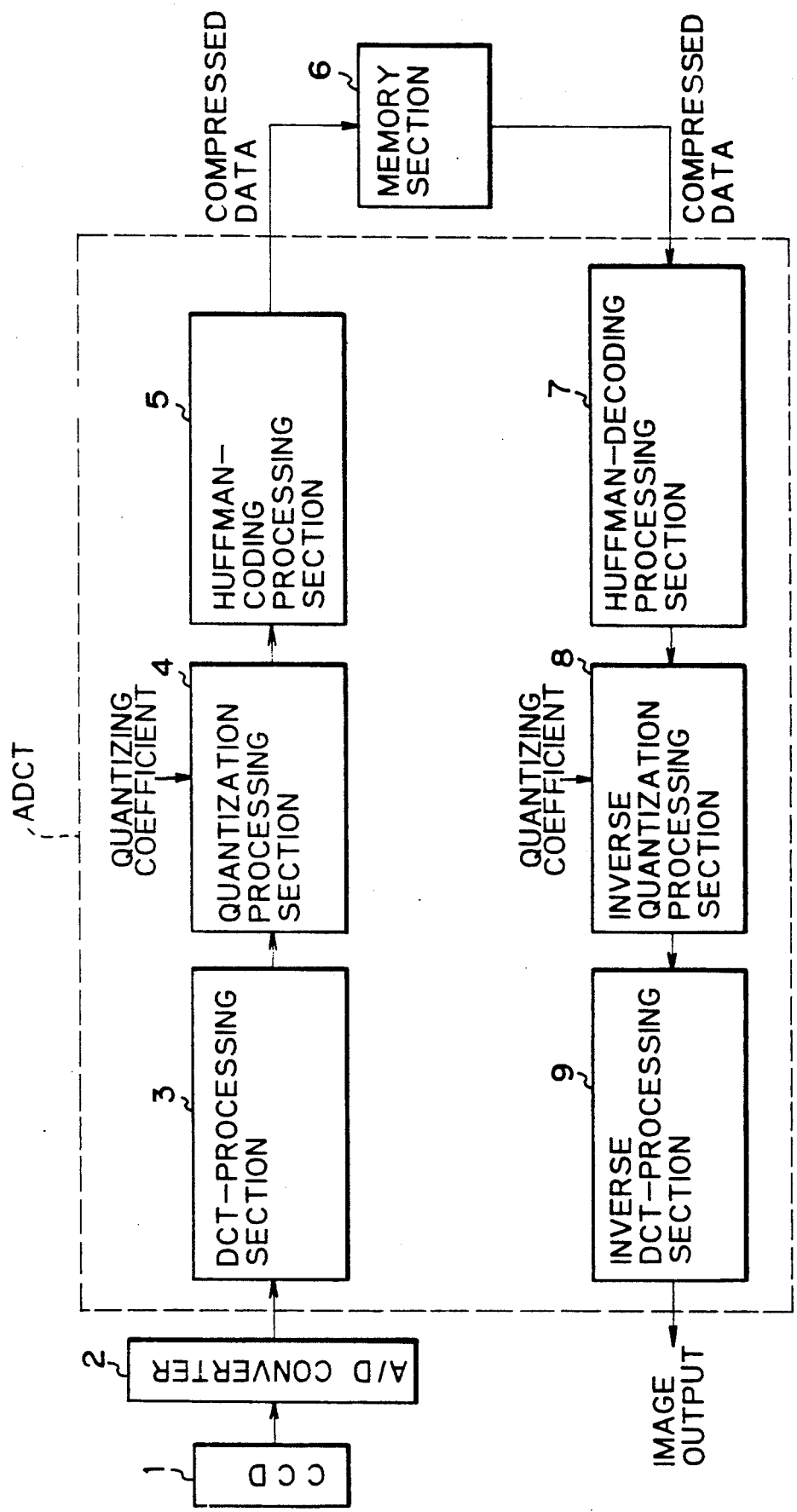
FIG. 1 is a block diagram showing the construction of a general DCT/inverse DCT processor.

As shown in FIG. 1, when a color photographed image is recorded as a still image, information of the photographed image is converted to an electric signal by e.g., a charge coupled device 1. The charge coupled device is called a CCD in the following description. Thereafter, this electric signal is converted to a digital signal by an A/D converter 2. Image data of this digital signal are transmitted to a DCT-processing section 3 described later in detail. In this DCT-processing section 3, one image is divided into a plurality of image blocks and discrete cosine transformation (DCT) processing is performed every image block. DCT-processed image data $A_{ij}$ are quantized by a quantization processing section 4 in accordance with the following formula based on a quantizing coefficient $\alpha$ and a quantizing transformation coefficient $Q_{ij}$ prescribed by the Joint Photographic Export Group.

Quantization processing formula: $B_{ij} = A_{ij}/\alpha/Q_{ij}$

In this formula, reference numeral $B_{ij}$ designates image component data after quantization.

The quantized image component data $B_{ij}$ are Huffman-coded by a Huffman-coding processing section 5, thereby compressing the image component data. The compressed image data are stored to a memory section 6. Thus, the photographed image information is compressed and stored to the memory section 6.

The compressed image data stored to the memory section 6 are reproduced as an original photographed image as follows. Namely, the compressed image data read out of the memory section 6 are decoded by a Huffman-decoding processing section 7 and are converted to image component data $B_{ij}$. These image component data are inversely quantized by an inverse quantization processing section 8 and are converted to image data. These converted image data are inversely DCT-processed by an inverse DCT-processing section 9 described later in detail and are approximately reproduced as information of the original photographed image.

The DCT-processing section 3, the quantization processing section 4, the Huffman-coding processing section 5, the Huffman-decoding processing section 7, the inverse quantization processing section 8 and the inverse DCT-processing section 9 constitute an ADCT-processing section.

For example, with respect to a series of data compression and extension, the quantization processing section 4, the Huffman-coding processing section 5, the Huffman-decoding processing section 7 and the inverse quantization processing section 8 are constructed as shown by "Journal of Image Electronic Society of Japan" Vol. 18, No. 6, pp. 398 to 407 in 1989.

Figure 2:
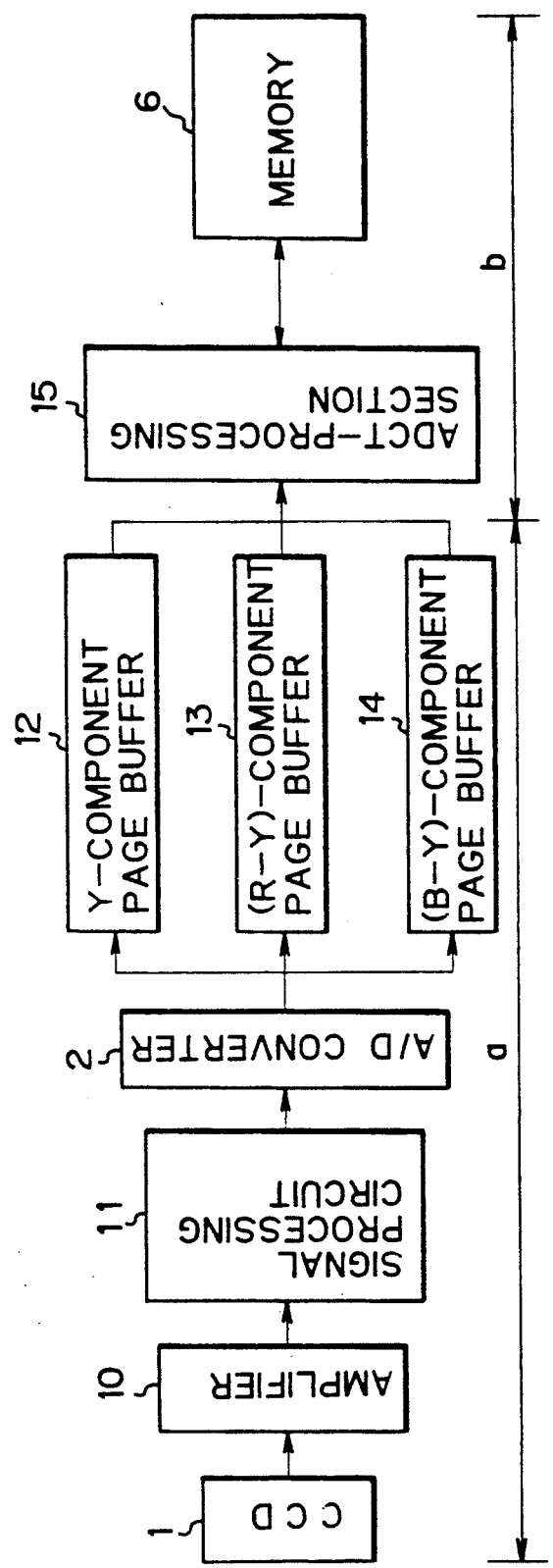
FIG. 2 is a block diagram showing the construction of an orthogonal transformation arithmetic unit in general DCT-processing.
Figures 6, 7:
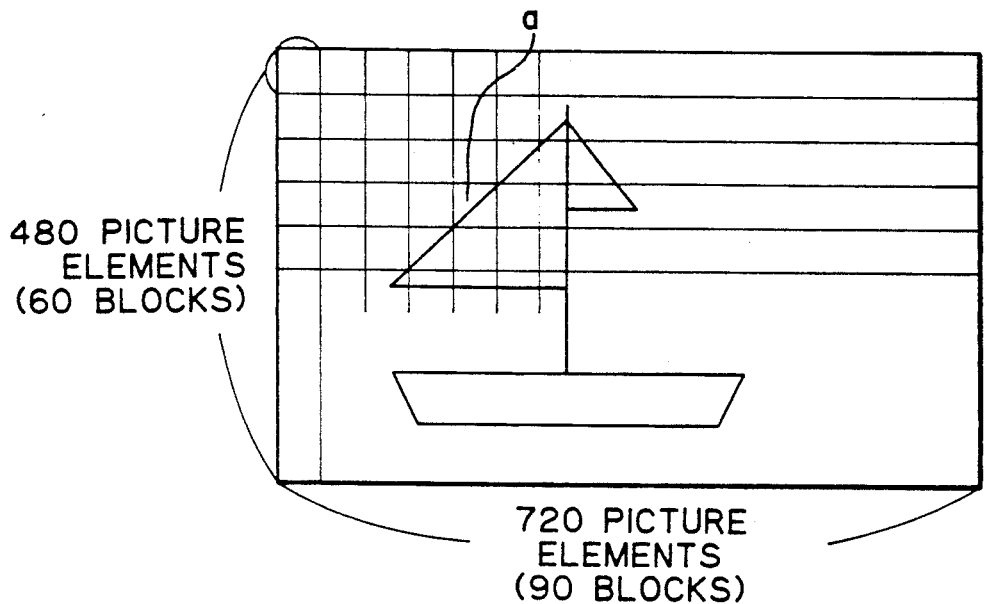
FIG. 6 is a view showing blocks of one image.
FIG. 7 is a view showing a concrete example of image data after the DCT-processing.

As shown in FIG. 2, when the color photographed image is concretely recorded as a still image, the color photographed image is converted to an electric signal by the charge coupled device 1 and is converted to a brightness signal (Y) and color difference signals (R-Y, B-Y) by a signal processing circuit 11 through an amplifier 10. These signals (Y), (R-Y), (B-Y) are respectively converted to digital signals by the A/D converter 2. Thereafter, respective data of these converted signals are temporarily stored to a Y-component page buffer 12, an (R-Y)-component page buffer 13 and a (B-Y)-component page buffer 14 corresponding to these converted signals. For example, when one photographed image is constructed by only a sheet of paper having size A4, the respective component data of the signals (Y), (R-Y) and (B-Y) stored to these page buffers 12 to 14 are constructed by information of all images drawn on this sheet. For example, as shown in FIG. 6, one photographed image is constructed by a total of 5400 image blocks divided into 60 image blocks in a longitudinal direction and 90 image blocks in a transversal direction. One image block is constructed by a total of 64 picture elements composed of 8 picture elements in each of the longitudinal and transversal directions. Data of each of the picture elements every one image block mentioned above are supplied to an ADCT-processing section 15. In the ADCT-processing section 15, the component data respectively transmitted from the Y-component page buffer 12, the (R-Y)-component page buffer 13 and the (B-Y)-component page buffer 14 are compressed to store these component data to the memory 6. Conversely, the compressed data stored to the memory 6 are decoded to the original component data in the ADCT-processing section 15.

Figure 3:
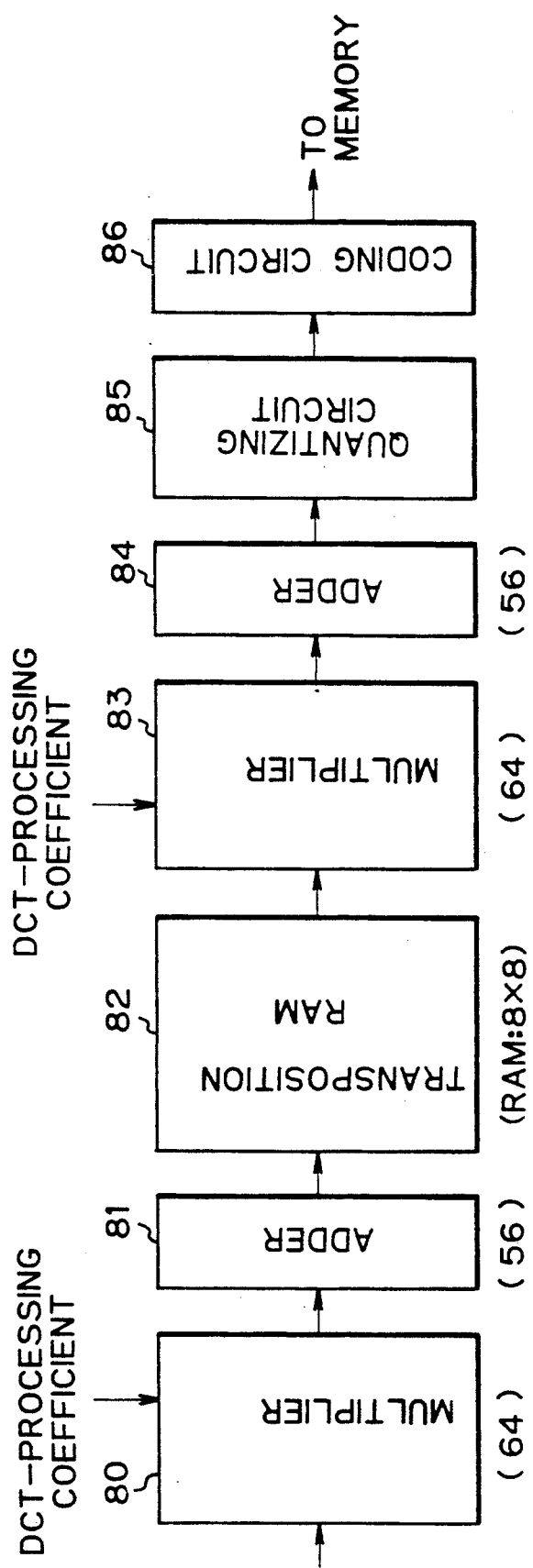
FIG. 3 is a block diagram showing a circuit structure with respect to data compression in an ADCT-processing section shown in FIG. 2.

The ADCT-processing section 15 is constructed as shown in FIG. 3. A multiplier 80 (constructed by 64 multipliers) sequentially receives data of the picture elements constituting one image block and a DCT-processing coefficient every one image block respectively from the Y-component page buffer 12, the (R-Y)-component page buffer 13 and the (B-Y)-component page buffer 14. The multiplier 80 then performs a multiplying operation with respect to the above picture element data and the DCT-processing coefficient. The multiplier 80 outputs multiplied data to an adder 81 (constructed by 56 adders). The adder 81 performs an adding operation with respect to the supplied data and the data of added results are transmitted to a transposition RAM 82 which can store the added data into 8×8 memory blocks. Two-dimensional DCT-processing of the photographed image of two-dimensional information is performed by one-dimensional DCT-processings with respect to longitudinal and transversal data of the image. Thus, the one-dimensional DCT-processing is first performed by the multiplier 80 and the adder 81.

A formula for the two-dimensional DCT-processing is represented by the following formula (1).

$$F(U,V) = (2C(U)/N)(2C(V)/N) \sum_{i=0}^{N-1} \sum_{j=0}^{N-1} f(i,j)\cos((2i + 1)U\pi/2N) \cdot \cos((2j + 1)V\pi/2N) \quad (1)$$

When $U = 0$, $C(U) = 1/\sqrt{2}$
When $U \neq 0$, $C(U) = 1$

When $V = 0$, $C(V) = 1/\sqrt{2}$
When $V \neq 0$, $C(V) = 1$

In the formula (1), reference numeral $f(i, j)$ designates data of a picture element.

The data of the added results read out of the transposition RAM 82 are transmitted to a multiplier 83 (constructed by 64 multipliers) to further perform the one-dimensional DCT-processing. A multiplying operation of the multiplier 83 is similar to that of the multiplier 80. The multiplier 83 performs a multiplying operation with respect to the date of the added results read out of the transposition RAM 82. The data of multiplied results are transmitted to an adder 84 (constructed by 56 adders) for performing an adding operation, thereby executing the two-dimensional DCT-processing. The two-dimensional ADCT-processing is then completed through a quantizing circuit 85 and a coding circuit 86.

The above-mentioned operations will be further explained in detail in the following description.

For example, it is assumed that the data of one block of a photographed image stored to the Y-component page buffer 12 are provided as shown in FIG. 4. Component data $X_{00}$ to $X_{70}$ are stored in a first column of this image block and are sequentially supplied to the multiplier 80. DCT-processing coefficients of the following (8×8) matrix are supplied to the multiplier 80.

$$\begin{vmatrix} A_{00} & A_{01} & A_{02} & A_{03} & A_{04} & A_{05} & A_{06} & A_{07} \\ A_{10} & \cdots & & & & & & A_{17} \\ A_{20} & \cdots & & & & & & A_{27} \\ A_{30} & \cdots & & & & & & \\ \\ A_{40} & \cdots & & & & & & \\ A_{50} & \cdots & & & & & & \\ A_{60} & \cdots & & & & & & \\ A_{70} & \cdots & & & & & & A_{77} \end{vmatrix}$$

In this matrix, the DCT-processing coefficients designated by "- - -" are omitted for brevity.

Accordingly, the multiplier 80 performs the multiplying operation with respect to the above data $X_{00}$ to $X_{70}$ and the DCT-processing coefficients $A_{00}$ to $A_{70}$. The data of multiplied results are set to $Z_{00}$ to $Z_{70}$. For example, the data value $Z_{00}$ is represented by the following formula.

$$Z_{00} = A_{00} \cdot X_{00} + A_{01} \cdot X_{10} + A_{02} \cdot X_{20} + A_{03} \cdot X_{30} + A_{04} \cdot X_{40} + A_{05} \cdot X_{50} + A_{06} \cdot X_{60} + A_{07} \cdot X_{70} \quad (2)$$

As can be seen from the above formula (2), adding values with respect to the above calculated data values are added to each other by the adder 81 subsequent to the multiplier 80, thereby finally calculating the data value $Z_{00}$. Similarly, the data values $Z_{10}$ to $Z_{70}$ are calculated. The following matrix (3) is obtained from the above-mentioned calculated data values.

$$\begin{bmatrix} Z_{00} \\ Z_{10} \\ Z_{20} \\ Z_{30} \\ Z_{40} \\ Z_{50} \\ Z_{60} \\ Z_{70} \end{bmatrix} = \begin{bmatrix} A_{00} & A_{01} & A_{02} & A_{03} & A_{04} & A_{05} & A_{06} & A_{07} \\ A_{10} & \cdots & & & & & & \\ A_{20} & \cdots & & & & & & \\ A_{30} & \cdots & & & & & & \\ A_{40} & \cdots & & & & & & \\ A_{50} & \cdots & & & & & & \\ A_{60} & \cdots & & & & & & \\ A_{70} & \cdots & & & & & & A_{77} \end{bmatrix} \begin{bmatrix} X_{00} \\ X_{10} \\ X_{20} \\ X_{30} \\ X_{40} \\ X_{50} \\ X_{60} \\ X_{70} \end{bmatrix} \quad (3)$$

The calculated data $Z_{00}$ to $Z_{70}$ are transmitted to the transposition RAM 82. Similarly, data $X_{01}$ to $X_{71}$ in a second column of the image block shown in FIG. 4 are DCT-processed and obtained as data $Z_{01}$ to $Z_{71}$. Similarly, data $Z_{02}$ to $Z_{77}$ are sequentially calculated and transmitted to the transposition RAM 82, thereby completing the one-dimensional DCT-processing.

As shown in FIG. 5, the respective data $Z_{00}$ to $Z_{77}$ are stored to the transposition RAM 82 in an order from the first column to the eighth column. When all one-dimensional DCT-processed data are thus stored to the transposition RAM 82, the transposition RAM 82 reads data $Z_{70}$ to $Z_{77}$ stored in a lowermost row I in FIG. 5 and transmits these read data to the multiplier 83.

Multiplying and adding operations of the multiplier 83 and the adder 84 are respectively similar to those of the multiplier 80 and the adder 81 mentioned above. Second one-dimensional DCT-processing is performed by the multiplier 83 and the adder 84. Data $Z_{60}$ to $Z_{67}$ stored in the next row II are transmitted from the transposition RAM 82 to the multiplier 83. Similarly, data $Z_{00}$ to $Z_{07}$ stored in row VIII are transmitted to the multiplier 83. Accordingly, a reading order of data Z stored in the transposition RAM 82 is different from a writing order of these data written to the transposition RAM 82. Therefore, it is impossible to read data out of the transposition RAM 82 until the data of one image block are completely written to the transposition RAM 82.

A predetermined quantizing operation with respect to the data Z transmitted from the adder 84 is performed by the quantizing circuit 85, thereby compressing these data. A predetermined coding operation with respect to the quantized data is then performed by the coding circuit 86, thereby providing coded data stored to the memory 6. The coded data are transmitted from the coding circuit 86 to the memory 6 and are stored in this memory 6.

The above operation of the orthogonal transformation arithmetic until relates to the Y-component data, but the orthogonal transformation arithmetic unit is similarly operated in the cases of the (R-Y)-component data and the (B-Y)-component data. The above-mentioned ADCT-processing operation is performed with respect to data compression for storing the data of a photographed image to the memory. Conversely, when data of the original photographed image are reproduced from the compressed data stored into the memory, the data read out of the memory are decoded by a decoding circuit and are inversely quantized by an inverse quantizing circuit. The inversely quantized data are reproduced as the photographed image data through a multiplier, an adder, a transposition RAM, a multiplier and an adder.

A formula for an inverse DCT-processing (IDCT-processing) inverse to the DCT-processing is represented by the following formula (4).

$$f(i,j) = \sum_{U=0}^{N-1} \sum_{V=0}^{N-1} (2C(U)/N)(2C(V)/N)F(U,V)\cos((2i + 1)U\pi/2N) \cdot \cos((2j + 1)V\pi/2N) \quad (4)$$

When $U = 0$, $C(U) = 1/\sqrt{2}$
When $U \neq 0$, $C(U) = 1$

When $V = 0$, $C(V) = 1/\sqrt{2}$
When $V \neq 0$, $C(V) = 1$

As mentioned above, in the DCT-processing and the IDCT-processing, it is necessary to perform 64 multiplying operations with respect to all input data and the DCT-processing coefficients composed of the (8×8) matrix, and perform 56 adding operations with respect to the multiplied results. Accordingly, a processing time required to perform the ADCT-processing including a memory operation with respect to the memory 6 as shown by line b in FIG. 2 is longer than a processing time from the charge coupled device 1 to the Y-component page buffer 12, the (R-Y)-component page buffer 13 or the (B-Y)-component page buffer 14 as shown by line a in FIG. 2. Therefore, it is necessary to dispose a memory for temporarily storing color and brightness information of one photographed image picture, circuit elements corresponding to the respective page buffers 12 to 14 shown in FIG. 2, and a frame memory. For example, in a still video camera, it is necessary to dispose a memory having a capacity of 7.5M bits with respect to one picture. Accordingly, there is a problem that the size of a circuit structure of the entire orthogonal transformation arithmetic unit is increased.

When an image is generally coded and coded data are reproduced as the original image, there is a case in which the size of an image obtained by the coded data is reduced or enlarged in comparison with the original image. In such reducing and enlarging processings, inverse orthogonal transformation processing is performed with respect to orthogonally transformed data and these data are reproduced as the original image. Thereafter, the reducing and enlarging processings are performed with respect to the reproduced data. When the image is reproduced and the reducing and enlarging processings are further performed with respect to the reproduced image, it is necessary to separately dispose a processing unit for performing the reducing and enlarging processings. Further, there is a problem that a processing time is further increased by separately disposing such a processing unit for performing the reducing and enlarging processings.

As mentioned above, the general orthogonal transformation arithmetic unit for performing the DCT-processing and the inverse DCT-processing has the DCT-processing section 3 and the inverse DCT-processing section 9. Two main arithmetic circuits similarly operated, etc. are disposed in the DCT-processing section 3 and the inverse DCT-processing section 9. An area for these main arithmetic circuits amounts to about 90 percent of an area for a semiconductor circuit chip constituting a DCT/inverse DCT processor. Therefore, the size of a circuit structure is increased by these two main arithmetic circuits.

Accordingly, the circuit structure is large-sized in the general orthogonal transformation arithmetic unit for performing the DCT/inverse DCT-processings.

Further, the general orthogonal transformation arithmetic unit has the following problems.

For example, the above two-dimensional DCT-processing is performed with respect to data of each of picture elements in an image block shown by reference numeral a in FIG. 6. A group of these DCT-processed data are shown in FIG. 7. The DCT-processed image data are also constructed by 8 picture elements in each of longitudinal and transversal directions in FIG. 7 so that the data group of one image block is constructed by a total of 64 picture elements. Frequency components of the DCT-processed image data are increased as the image data in the longitudinal direction are located downward in FIG. 7. The frequency components of the DCT-processed image data are increased as the image data in the transversal direction are located rightward in FIG. 7. Accordingly, as can be seen from FIG. 7, when the image data are DCT-processed, values of the image data are reduced in regions of high frequency components in the longitudinal and transversal directions and are increased in regions of low frequency components. Such decrease and increase in value of the image data constitute features of the DCT-processing. The image data group after the DCT-processing is designated by reference numeral $A_{ij}$.

Such DCT-processed image data are quantized as shown in FIG. 1. The quantized image data group is designated by reference numeral $B_{ij}$. The image data group $B_{ij}$ is calculated by the following formula (5).

$$Bij = Aij/(\alpha \cdot Qij) \quad (5)$$

Here, reference numeral $Q_{ij}$ designates a data group composed of a total of 64 values represented by an (8×8) matrix as shown in FIG. 8 and prescribed by the Joint Photographic Export Group. Reference numeral $\alpha$ is a quantizing coefficient equal to or less than value 1.

Concretely, image data values in the respective rows and columns of the image data group $A_{ij}$ shown in FIG. 7 are respectively divided by data values in the corresponding rows and columns of the data group $Q_{ij}$ and are further divided by the quantizing coefficient $\alpha$, thereby calculating values of the image data group $B_{ij}$ in the corresponding rows and columns. For example, a direct current component (which is also called a DC component) 272.2 shown by reference numeral b in FIG. 7 has lowest spatial frequencies in vertical and horizontal directions in the image data group $A_{ij}$. This direct current component 272.2 is divided by value 16 of the data group $Q_{ij}$ shown by reference numeral c in FIG. 8 corresponding to the row and the column of this direct current component. This divided value is further divided by the quantizing coefficient $\alpha$. For example, when the quantizing coefficient $\alpha$ is set to 0.125, the divided value (272.2/16)/0.125 = 136 is obtained. Thus, the above calculations are made with respect to all 64 image data components of the image data group $A_{ij}$, thereby obtaining quantized image data group $B_{ij}$ shown in FIG. 9.

The image data group $A_{ij}$ as a denominator has small values in the above high frequency component region thereof so that the quantized values of the image data group $B_{ij}$ are zero in a corresponding high frequency component region thereof. In contrast to this, the image data group $A_{ij}$ has large values in the low frequency component region thereof so that the quantized values of the image data group $B_{ij}$ are nonzero in a corresponding low frequency component region thereof. The quantized value zero means that there are no image data and no original picture image is reproduced even when the image data having the quantized value zero are demodulated. Accordingly, the quality of a reproduced image is reduced as the number of zeros is increased with respect to the 64 data values of the quantized image data group $B_{ij}$. In contrast to this, the quality of a reproduced image is improved as the number of zeros is decreased with respect to the 64 data values of the quantized image data group $B_{ij}$.

In the data group $B_{ij}$ shown in FIG. 9, there is a zero boundary region shown by a broken line in this figure in which all the quantized values are zero. This zero boundary region is moved in accordance with an amount of data having the quantized value zero. Namely, when there is a large amount of data having the quantized value zero and the quality of a reproduced image is therefore reduced, the zero boundary region is moved in a direction shown by arrow d in FIG. 9. in contrast to this, when there is a small amount of data having the quantized value zero and the quality of a reproduced image is therefore improved, the zero boundary region is moved in a direction shown by arrow e in FIG. 9. As mentioned above, the values of the image data group $A_{ij}$ depend on a photographed image and the data group $Q_{ij}$ is constructed by predetermined values prescribed by the Joint Photographic Export Group. Accordingly, these data groups $A_{ij}$ and $Q_{ij}$ cannot be changed. Therefore, as can be seen from the above formula (5), it is sufficient to change the quantizing coefficient $\alpha$ so as to move the zero boundary region in the direction shown by the arrow d or e as mentioned above. The quantizing coefficient $\alpha$ is equal to or less than value 1 as mentioned above. Therefore, when the quantizing coefficient $\alpha$ is set to a value close to zero, all the values of the image data group $B_{ij}$ are increased so that the number of zeros with respect to the quantized data is reduced, thereby moving the zero boundary region in the direction shown by the arrow e. In contrast to this, when the quantizing coefficient $\alpha$ is set to a value close to one, all the values of the image data group $B_{ij}$ are decreased so that the number of zeros with respect to the quantized data is increased, thereby moving the zero boundary region in the direction shown by the arrow d. Thus, it is possible to change the image quality by suitably selecting the quantizing coefficient α when the quantizing processing is performed.

The quantized image data group $B_{ij}$ is Huffman-coded as shown in FIG. 1 and the quantized image component data are compressed. A Huffman-coding method is a coding method for changing a bit length of a coding word in accordance with frequency in generation of respective data. In the case of data having a high frequency in generation, the coding word is short and has e.g., one bit length. In contrast to this, in the case of data having a low frequency in generation, the coding word is long and has e.g., 7 bit length. Additional bit data are added to Huffman-codes determined by the Joint Photographic Export Group in advance in accordance with the respective quantized values of the image data group $B_{ij}$ so that these quantized values are coded with respect to data recorded to a recording medium. For example, Table 1 shows an amount of compressed data provided by Huffman-coding the respective quantized values of the image component data group $B_{ij}$ shown in FIG. 9.

TABLE 1

| | component data | bit number (additional bit number) | Huffman code | Huffman code length | compressed data amount |
|---|---|---|---|---|---|
| DC component | 136 | 8 | 111110 | 6 | 14 |
| AC component | −10 | 4 | 1100 | 4 | 8 |
| | 7 | 3 | 100 | 3 | 6 |
| | −3 | 2 | 01 | 2 | 4 |
| | 3 | 2 | 01 | 2 | 4 |
| | 4 | 3 | 100 | 3 | 6 |
| | 2 | 2 | 01 | 2 | 4 |
| | −1 | 1 | 00 | 2 | 3 |
| | 2 | 2 | 01 | 2 | 4 |
| | 2 | 2 | 01 | 2 | 4 |
| | −1 | 1 | 00 | 2 | 3 |
| | 1 | 1 | 00 | 2 | 3 |
| | 1 | 1 | 00 | 2 | 3 |
| | −1 | 1 | 00 | 2 | 3 |
| | EOB | 0 | 1010 | 4 | 4 |
| total (bits) | | | | | 73 |

Figure 10:
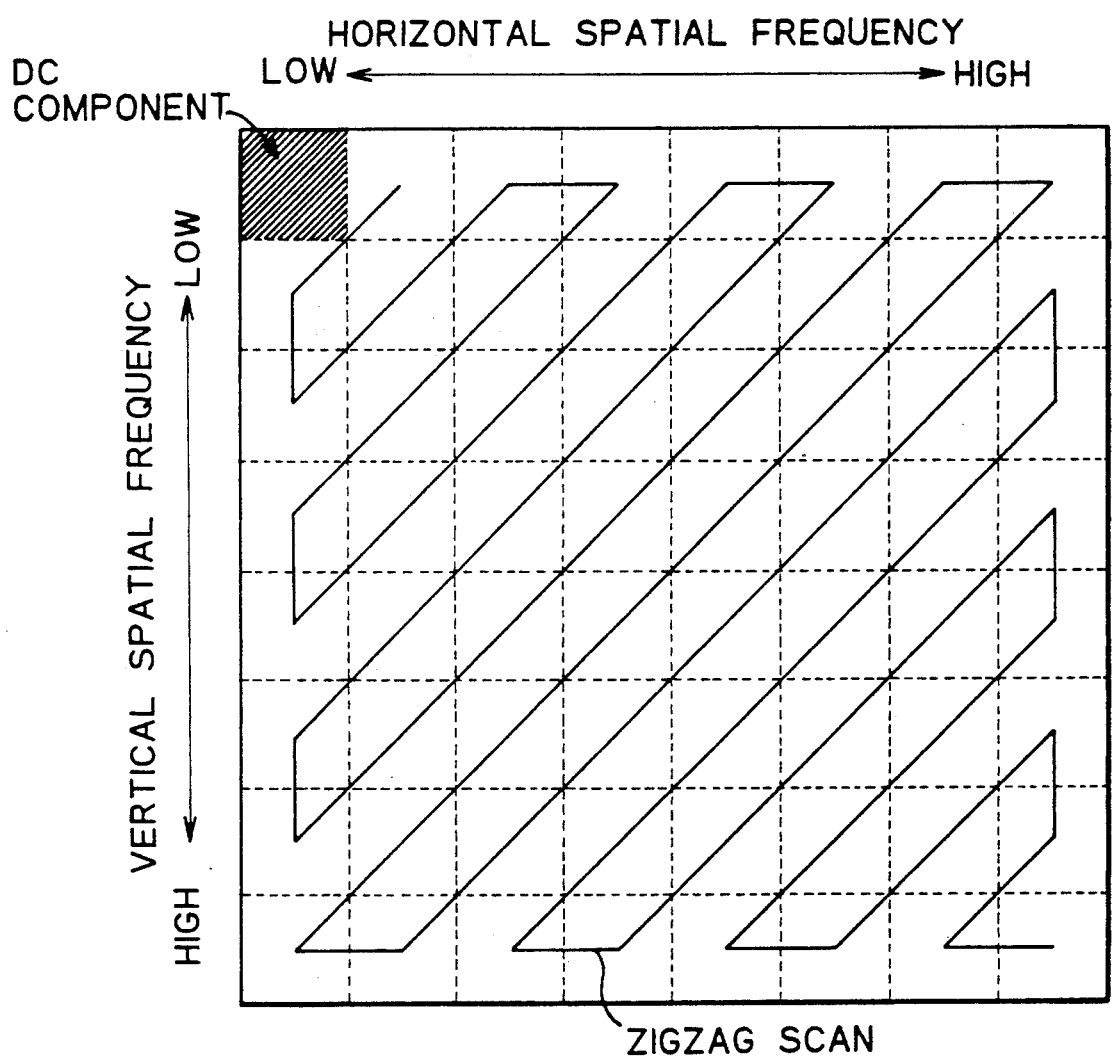
FIG. 10 is a view showing a zigzag scanning direction in Huffman-coding processing.

In Table 1, an alternative current component (AC component) shows all image component data except for the above direct current component (DC component). As shown by arrows in FIG. 10, all the data of alternative current components are extracted by scanning the image component data group $B_{ij}$ in a zigzag shape when an alternative current component f adjacent to the direct current component at a spatial frequency in the horizontal direction is used as a starting point. It is possible to easy find the zero boundary region by such a zigzag scanning operation since the scanning operation is performed in parallel with the zero boundary region. Further, after the zero boundary region is scanned, all the remaining image component data are zero so that it is possible to easy compress the Huffman-coded data at a high level.

Data compression will next be described concretely with reference to Table 1. With respect to direct current component data 136, the number of additional bits is set to 8 and Huffman codes are set to 111110 having a 6-bit length. These values are definitely determined by the Joint Photographic Export Group. As mentioned above, an amount of compressed data is constructed by the additional bits and the Huffman codes. Accordingly, the compressed data amount of the component data 136 is constructed by 14 bits as a sum of the lengths of the additional bits and the Huffman codes. An amount of compressed data with respect to an alternative current component extracted by the zigzag scanning operation is similarly determined as shown in Table 1. It is possible to calculate a total of the numbers of constructional bits of all the compressed data amounts with respect to the direct and alternative current components. In this embodiment, the total of the numbers of constructional bits is set to 73 as shown in Table 1. Accordingly, in this embodiment, the data amount is constructed by 73 bits with respect to one image block. As mentioned above, for example, the one image block is constructed by 64 (=8×8) picture elements and each of these picture elements is constructed by 8 bits. In this case, this one image block has a data amount of 512 bits so that the data compressed by about 1/7 (=73/512). Namely, data compressibility is 1/7 when the quantized coefficient α is set to 0.125 as mentioned above. For example, the data compressibility 1/7 means that image information in seven sheets can be stored to a recording medium having a memory capacity of 512 bits per one image block.

As mentioned above, to change the data compressibility, it is sufficient to change the number of nonzero values in the quantized image component data group $B_{ij}$. Namely, it is sufficient to move the above zero boundary region and change the quantizing coefficient α.

When the quantizing coefficient α is set to a value close to zero, the quality of a reproduced image is improved, but the amount of image data is correspondingly increased, thereby reducing the data compressibility. The reduction of the data compressibility means that the data compressibility is bad and close to one. In contrast to this, when the quantizing coefficient α is close to one, the quality of a reproduced image is reduced, but the data compressibility is improved. Thus, it is possible to determine superiority or inferiority of the quality of the reproduced image by changing the quantizing coefficient α. When the data compressibility is reduced, the number of sheets of still images stored to one memory medium is reduced although the image quality is improved. In contrast to this, when the data compressibility is increased, the number of sheets of images stored to the memory medium can be increased although the image quality is reduced.

The above description relates to one image block within one image. When the above-mentioned processing is performed with respect to the one image, the above-mentioned operations are performed with respect to 5400 image blocks constituting the one image.

The above description relates to a process for storing the photographed image to the memory medium. A reproduced image with respect to such a stored image can be obtained by a process completely reverse to the above-mentioned process as shown in FIG. 1.

In a general apparatus for compressing and extending a color image by using the DCT-processing, there is no orthogonal transformation arithmetic unit having the relation between the quantizing coefficient $a$, the image quality and the number of sheets of stored images as mentioned above.

A first structure of the present invention resides in an orthogonal transformation arithmetic unit for performing a discrete cosine transformation with respect to a digital signal and compressing discrete cosine transformed data by quantizing and Huffman-coding processings thereof, the orthogonal transformation arithmetic unit Huffman-decoding the compressed data and demodulating the Huffman-decoded data to a digital signal by performing inverse quantization and an inverse discrete cosine transformation with respect to the Huffman-decoded data, the orthogonal transformation arithmetic unit comprising a memory section for storing one line block of image data of brightness and color signals converted to digital signals; and a section for processing the discrete cosine transformation and having a preprocessing circuit for performing adding and subtracting operations with respect to the image data read out of the memory section such that some values of discrete cosine transformation coefficients used in the discrete cosine transformation are partially set to zero.

In such a first structure, the discrete cosine transformation processing section performs the discrete cosine transformation with respect to data obtained by performing the adding and subtracting operations about digitally converted data of the brightness and color signals supplied from the memory section. Thus, it is possible to partially set some values of the discrete cosine transformation coefficient used in the discrete cosine transformation to zero. Accordingly, the discrete cosine transformation processing section can reduce the number of operations required to perform the discrete cosine transformation, thereby reducing a time required to perform the discrete cosine transformation.

Since the time required to process the discrete cosine transformation is reduced, it is not necessary for the memory section to store all information of one photographed image. Accordingly, with respect to the photographed image composed of 60 blocks, it is sufficient for the memory section to store image data constructed by a total of 180 blocks composed of 90 blocks extending in a horizontal direction of the photographed image with respect to two blocks in a vertical direction thereof. Namely, it is sufficient to dispose two memory sections for storing one line block of image data, thereby reducing the size of a circuit structure of the memory section. Thus, the size of a circuit structure of the entire orthogonal transformation arithmetic unit is reduced by the memory section and the discrete cosine transformation processing section.

Concretely, in the present invention, input data $X_0$, $X_1$, - - - , $X_7$ are converted to $(X_0+X_7)$, $(X_2+X_5)$, $(X_1+X_6)$, $(X_3+X_4)$, $(X_0-X_7)$, $(X_2-X_5)$, $(X_1-X_6)$ and $(X_3-X_4)$ by a preprocessing circuit. A DCT-transformation formula is represented by the following matrix (6) when the data converted by the preprocessing circuit are used as variables.

$$
\begin{bmatrix} Z_{00} \\ Z_{20} \\ Z_{40} \\ Z_{60} \\ Z_{10} \\ Z_{30} \\ Z_{50} \\ Z_{70} \end{bmatrix} = 
\begin{bmatrix} 
a & a & a & a & : & 0 & 0 & 0 & 0 \\
a & -a & -a & a & : & 0 & 0 & 0 & 0 \\
b & d & -b & -d & : & 0 & 0 & 0 & 0 \\
a & -b & b & -d & : & 0 & 0 & 0 & 0 \\
\cdots & \cdots & \cdots & \cdots & & \cdots & \cdots & \cdots & \cdots \\
0 & 0 & 0 & 0 & : & e & f & g & h \\
0 & 0 & 0 & 0 & : & h & -e & g & f \\
0 & 0 & 0 & 0 & : & f & -g & -e & -h \\
0 & 0 & 0 & 0 & : & g & -h & f & -e 
\end{bmatrix}
\begin{bmatrix} X_{00} + X_{70} \\ X_{20} + X_{50} \\ X_{10} + X_{60} \\ X_{30} + X_{40} \\ X_{00} - X_{70} \\ X_{20} - X_{50} \\ X_{10} - X_{60} \\ X_{30} - X_{40} \end{bmatrix}
\quad (6)
$$

Here,
$a = \cos(1/4)\pi$
$b = \cos(1/8)\pi$
$d = \sin(1/8)\pi$
$e = \cos(1/16)\pi$
$f = \cos(3/16)\pi$
$g = \sin(1/16)\pi$
$h = \sin(3/16)\pi$ Some coefficients of the matrix (6) are zero. It is not necessary to perform a multiplying operation with respect to the zero coefficients of this matrix. Accordingly, it is sufficient to perform 32 multiplying operations and 24 adding operations. In a data extending process, a calculating formula of an IDCT-processing is provided by the following matrix (7).

$$
\begin{bmatrix} x_0 + x_7 \\ x_2 + x_5 \\ x_1 + x_6 \\ x_3 + x_4 \\ x_0 - x_7 \\ x_2 - x_5 \\ x_1 - x_6 \\ x_3 - x_4 \end{bmatrix} =
\begin{bmatrix}
a & b & a & d & 0 & 0 & 0 & 0 \\
a & -d & -a & b & 0 & 0 & 0 & 0 \\
a & d & -a & -b & 0 & 0 & 0 & 0 \\
a & -b & a & -d & 0 & 0 & 0 & 0 \\
0 & 0 & 0 & 0 & e & f & h & g \\
0 & 0 & 0 & 0 & h & -e & g & f \\
0 & 0 & 0 & 0 & f & -g & -e & -h \\
0 & 0 & 0 & 0 & g & -h & f & -e
\end{bmatrix}
\begin{bmatrix} Z_0 \\ Z_2 \\ Z_4 \\ Z_6 \\ Z_1 \\ Z_3 \\ Z_5 \\ Z_7 \end{bmatrix}
\quad (7)
$$

After the IDCT-processing is performed by using the matrix (7), the data $(X_0+X_7)$, $(X_2+X_5)$, $(X_1+X_6)$, $(X_3+X_4)$, $(X_0-X_7)$, $(X_2-X_5)$, $(X_1-X_6)$ and $(X_3-X_4)$ are returned to data $X_0, X_1, $ - - - $, X_7$ in accordance with aftertreatment.

In a DCT-processing circuit, the number of multipliers is reduced from 64 in a general case to 32 with respect to a block of $(8 \times 8)$ picture elements. Further, the number of adders is also reduced from 56 in the general case to 24. As a result, a DCT-processing speed is increased in proportion to the reduction of the numbers of multipliers and adders. For example, in the above case, the DCT-processing speed is increased twice or more so that the processing speed of the DCT-processing circuit is faster than a reading speed of a charge coupled device (CCD) reading element. Accordingly, it is sufficient to set a memory amount of a memory device for junctioning the CCD-reading element and the DCT-processing circuit in a line unit.

Further, a second structure of the present invention comprises an orthogonal transformation arithmetic unit having an orthogonal transformation circuit for performing orthogonal transformation processing with respect to each of the blocks; and an inverse orthogonal transformation circuit for returning orthogonally transformed data to original image data; the inverse orthogonal transformation circuit having a processing block having a variable size and selecting an inverse orthogonal transformation coefficient corresponding to a designated size of the processing block, the inverse orthogonal transformation circuit performing inverse orthogonal transformation processing with respect to the designated size of the processing block.

The operation of the above orthogonal transformation arithmetic unit in the second structure will next be described.

Figure 15A:
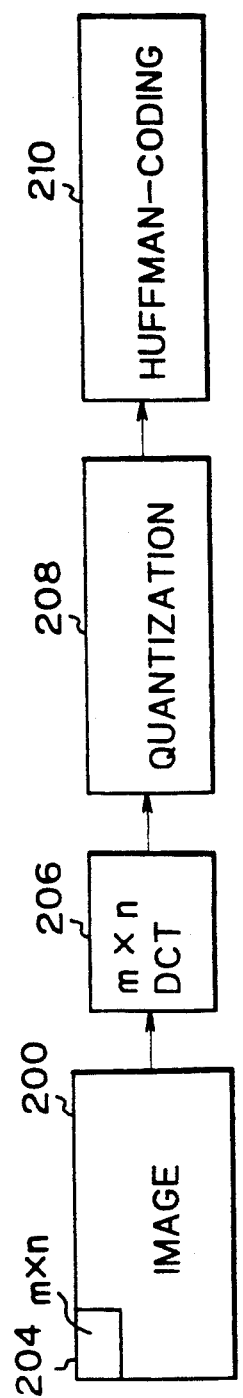
FIGS. 15a and 15b are block diagrams showing a data-compressing/extending system in an orthogonal transformation arithmetic unit in accordance with a second embodiment of the present invention.

The DCT-processing is performed as orthogonal transformation coding. The IDCT-processing is performed as inverse orthogonal transformation processing for reproducing coded data as an original image. The DCT-processing and the IDCT-processings will next be described with reference to FIGS. 15a and 15b. FIG. 15a shows a coding circuit. In this coding circuit, the DCT-processing is performed in a block unit of (m×n) picture elements with respect to an image 200. Reference numerals 204, 206, 208 and 210 respectively designate a block to be DCT-processed. A DCT-processing circuit, a quantizing circuit, and a Huffman-coding circuit. Huffman-coded data are stored to a memory as in the general orthogonal transformation arithmetic unit.

Figure 15B:
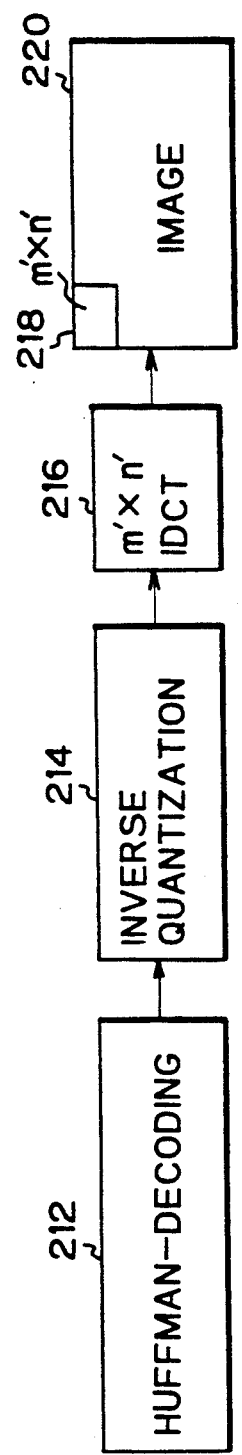

FIG. 15b shows a decoding circuit for reproducing the coded data as the original image. In this decoding circuit, reference numerals 212 and 214 respectively designate a Huffman-decoding circuit and an inverse quantizing circuit. An IDCT-processing circuit 216 performs the IDCT-processing with respect to inversely quantized DCT-transformation data. The IDCT-processing circuit 216 has a function for freely selecting the size of a reproduced image and can designate (m'×n') picture elements as the amount of a block of the reproduced image. The reproduced image is enlarged in size when the picture element numbers m' and n' are respectively greater than the picture element numbers m and n of the original image block. In contrast to this, the reproduced image is reduced in size when the picture element numbers m' and n' are respectively smaller than the picture element numbers m and n of the original image block. Reference numerals 218 and 220 respectively designate a block of the reproduced image and the reproduced image. The reproduced image 220 can be selectively reduced or enlarged in size with respect to the original image 200. Further, a size of the reproduced image 220 can be selectively set to be equal to that of the original image 200.

Figure 16A:
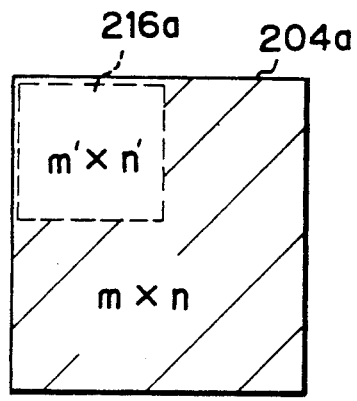
FIGS. 16a and 16b are views respectively showing reduced and enlarged images in the orthogonal transformation arithmetic unit in the second embodiment.
Figure 16B:
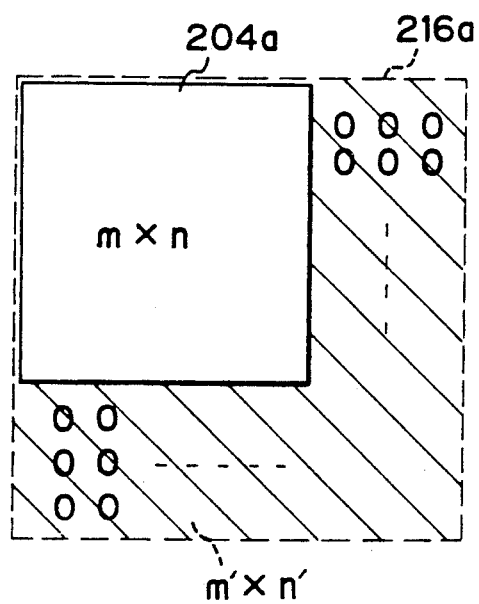

As shown in FIGS. 16a and 16b, reference numeral 204a designates a block of transformation data IDCT-processed by the IDCT-processing circuit 216. When the reproduced image is reduced in size, a high frequency region shown by hatching in FIG. 16a is removed from the above transformation data and only a low frequency region 216a is IDCT-processed to provide a block of a reduced image. In contrast to this, when the reproduced image is enlarged in size, zeros are added to a higher frequency region of the transformation data block 204a shown by hatching in FIG. 16b, thereby forming an enlarged block 216a. This enlarged block 216a is IDCT-transformed to provide a block of the reproduced image.

Further, a third structure of the present invention resides in an orthogonal transformation arithmetic unit for performing a discrete cosine transformation with respect to a digital signal and compressing discrete cosine transformed data by quantizing and Huffman-coding processings thereof, the orthogonal transformation arithmetic unit Huffman-decoding the compressed data and demodulating the Huffman-decoded data to a digital signal by performing inverse quantization and an inverse discrete cosine transformation with respect to the Huffman-decoded data, the orthogonal transformation arithmetic unit having a discrete cosine transformation/inverse discrete cosine transformation processing section for processing the discrete cosine transformation and the inverse discrete cosine transformation; the discrete cosine transformation/inverse discrete cosine transformation processing section comprising a coefficient memory section for storing coefficients required to perform the discrete cosine transformation and the inverse discrete cosine transformation and transmitting one of the coefficients selected in accordance with a control signal indicative of the discrete cosine transformation or the inverse discrete cosine transformation; a set of main arithmetic circuits for processing both the discrete cosine transformation and the inverse discrete cosine transformation by the transmitted coefficient and commonly used in both the processings of the discrete cosine transformation and the inverse discrete cosine transformation; and a section for selecting discrete cosine transformed data or inverse discrete cosine transformed data in accordance with the control signal.

In such a third structure, the DCT/inverse DCT-processing section can commonly execute both the DCT-processing and the inverse DCT-processing by one set of main processing circuits. The selecting section selects one of the DCT-transformed data and the inverse DCT-transformed data in accordance with the control signal transmitted thereto. Thus, a DCT-processing circuit and an inverse DCT-processing circuit separately disposed in the general orthogonal transformation arithmetic unit are unified as the DCT/inverse DCT-processing section, thereby reducing the size of a circuit structure of the entire orthogonal transformation arithmetic unit.

Further, a fourth structure of the present invention resides in an orthogonal transformation arithmetic unit of an adaptive discrete cosine transformation coding system for performing an orthogonal transformation with respect to information of a color still image using a discrete cosine transformation, the orthogonal transformation arithmetic unit comprising: a change-over switch for setting the number of sheets of a photographed image storable to a memory section having a constant memory capacity; a compressibility detecting section for automatically setting a quantizing coefficient used to compress an information amount of the photographed image until a predetermined image information amount in accordance with a signal indicative of the number of sheets of the photographed image transmitted from the change-over switch, the compressibility detecting section calculating a compressibility of the information amount and predicting a quality level of the stored photographed image based on the compressibility; and a display section for visually displaying a signal indicative of the image quality level transmitted from the compressibility detecting section.

In such a fourth structure, the compressibility detecting section arbitrarily sets a quantizing coefficient $\alpha$ such that information of the number of sheets of the photographed image manually set by the change-over switch is stored to the memory section. The quantizing coefficient $\alpha$ can be changed by the number of sheets of the photographed image set by an operator. When the quantizing coefficient $\alpha$ is changed, a zero boundary region is moved as mentioned above so that a quality of the stored photographed image can be changed. The compressibility detecting section calculates a compressibility based on the quantizing coefficient $\alpha$ and predicts an image quality level based on this compressibility. The display section visually displays this predicted image quality level. Accordingly, the operator can confirm the quality of the photographed image with respect to the set number of sheets thereof.

As mentioned above, the change-over switch, the compressibility detecting section and the display section indirectly change the quantizing coefficient $\alpha$ by setting the number of sheets of the stored image so as to set the quality of the stored photographed image.

An orthogonal transformation arithmetic unit in accordance with a first embodiment of the present invention will next be described.

As mentioned above, the DCT-processing can be represented by the above matrix (3). In the processing of a calculating formula, data $Z_{00}$ to $Z_{70}$ as one example of DCT-processed data are divided into even sections $Z_{00}$, $Z_{20}$, $Z_{40}$ and $Z_{60}$ and odd sections $Z_{10}$, $Z_{30}$, $Z_{50}$ and $Z_{70}$. Further, data $X_{00}$ to $X_{70}$ as one example of input data are set to $(X_{00}+X_{70})$, $(X_{20}+X_{50})$, $(X_{10}+X_{60})$, $(X_{30}+X_{40})$, $(X_{00}-X_{70})$, $(X_{20}-X_{50})$, $(X_{10}-X_{60})$ and $(X_{30}-X_{40})$. DCT-processing coefficients are constructed by an $(8 \times 8)$ matrix and are divided into four sections each constructed by a $(4 \times 4)$ matrix. As shown in the above matrix (6), each of two divisional sections e and f on a diagonal line of the $(8 \times 8)$ matrix is constructed by only zeros forming the $(4 \times 4)$ matrix. In this first embodiment, these divisional sections e and f are effectively used.

Figure 12:
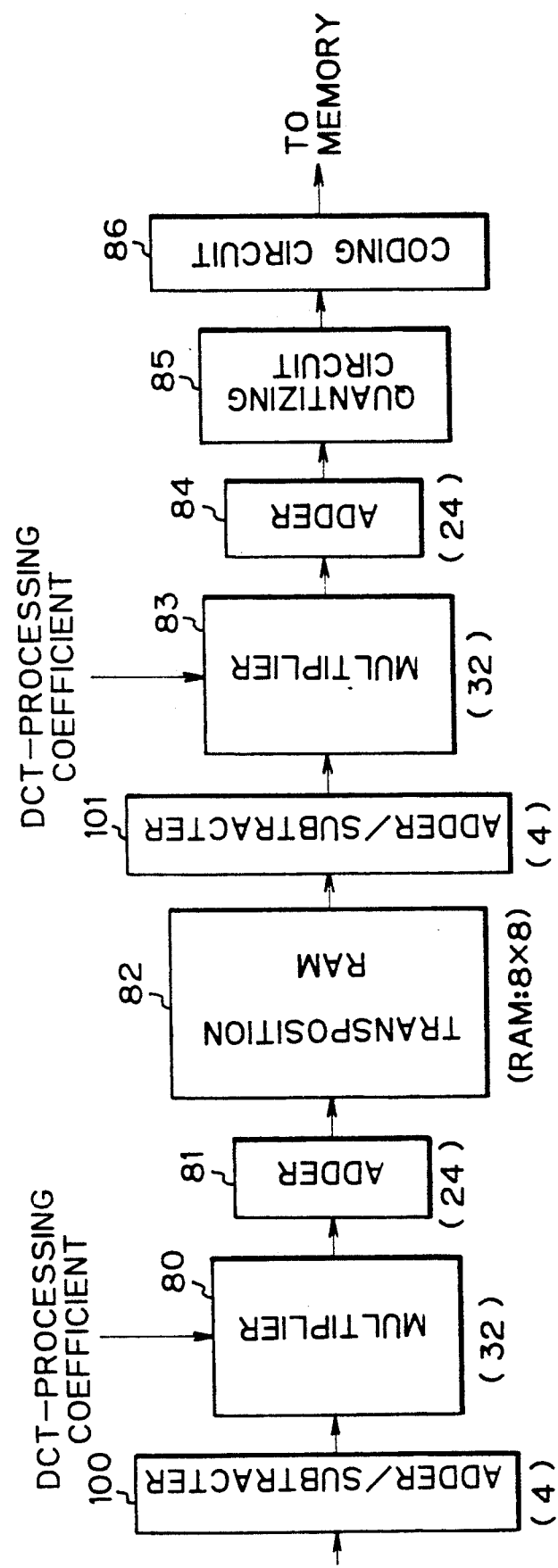
FIG. 12 is a block diagram showing one example of a circuit structure with respect to data compression in an ADCT-processing section shown in FIG. 11.

FIG. 12 shows an example of the construction of an ADCT-processing section 104 constituting the orthogonal transformation arithmetic unit using the DCT-processing in the first embodiment. In FIG. 12, the same constructional portions as those in FIG. 3 are designated by the same reference numerals.

Figure 14:
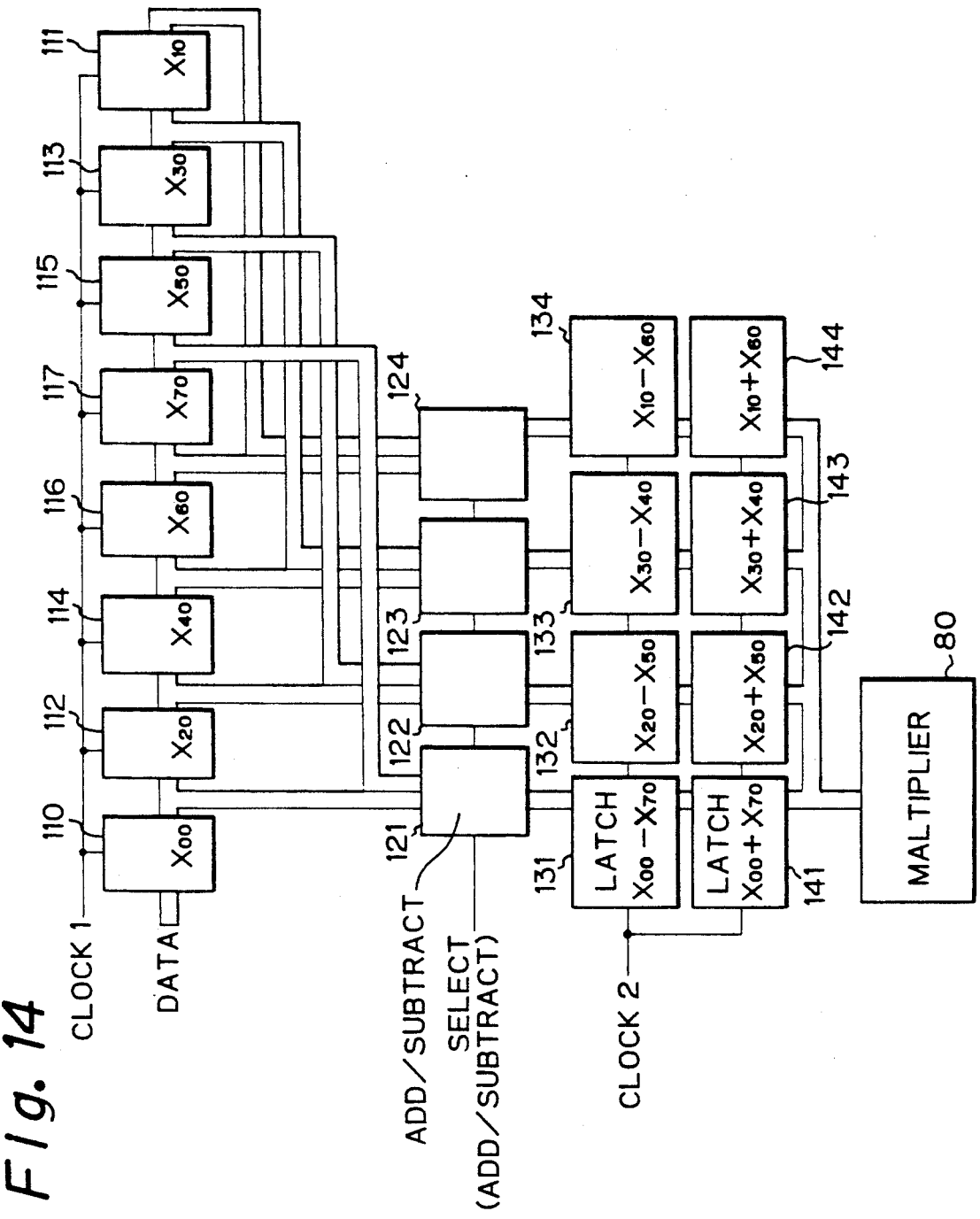
FIG. 14 is a block diagram showing an example of the construction of an adder/subtractor shown in FIG. 12.

An adder/subtracter 100 (constructed by 4 adders/subtracters) is a circuit for performing predetermined adding and subtracting operations with respect to e.g., the above data $(X_{00}+X_{70})$, $(X_{20}+X_{50})$, $(X_{10}+X_{60})$, $(X_{30}+X_{40})$, $(X_{00}-X_{70})$, $(X_{20}-X_{50})$, $(X_{10}-X_{60})$ and $(X_{30}-X_{40})$ about the input data $X_{00}$ to $X_{70}$. FIG. 14 shows one constructional example of this adder/subtracter 100.

In FIG. 14, shift registers/latch circuits 110 to 117 step and hold the respective input data $X_{00}$ to $X_{70}$ at a timing of a clock signal CLOCK1. Adding/subtracting circuits 121 to 124 receive two predetermined data held in the shift registers/latch circuits 110 to 117 and perform adding and subtracting operations in accordance with a selecting signal. For example, with respect to the above data $X_{00}$ to $X_{70}$, the adding/subtracting circuit 121 is connected to an output side of the latch circuit 110 for latching data $X_{00}$ and an output side of the latch circuit 117 for latching data $X_{70}$. The adding/subtracting circuit 122 is connected to an output side of the latch circuit 112 for latching data $X_{20}$ and an output side of the latch circuit 115 for latching data $X_{50}$. The adding/subtracting circuit 123 is connected to an output side of the latch circuit 114 for latching data $X_{40}$ and an output side of the latch circuit 113 for latching data $X_{30}$. The adding/subtracting circuit 124 is connected to an output side of the latch circuit 116 for latching data $X_{60}$ and an output side of the latch circuit 111 for latching data $X_{10}$. Shift registers/latch circuits 131 to 134, 141 to 144 step and hold data calculated by the adding/subtracting circuits 121 to 124 at a timing of a clock signal CLOCK2.

In FIG. 12, a multiplier 80 (constructed by 32 multipliers) holds coefficients a, b, d, e, f, g, h to perform multiplying and adding operations represented by the matrix (6) and performs 32 multiplying operations. An arithmetic unit for performing the IDCT-processing has constructions similar to those in the above-mentioned structure with respect to the DCT processing. Further, an arithmetic unit for performing DST (discrete sine transformation) and IDST (inverse discrete sine transformation) processings also has constructions similar to those in the above-mentioned structure with respect to the DCT processing.

As can be seen from FIG. 14, it is sufficient to dispose the four adding/subtracting circuits 121 to 124 since four kinds of adding and subtracting operations are performed with respect to eight input data. The adding/subtracter 100 is connected to the above multiplier 80 (see FIG. 12). A multiplying operation of the multiplier 80 is similar to the above-mentioned multiplying operation. In the general orthogonal transformation arithmetic unit, it is necessary to dispose a total of 64 multipliers 80 since the DCT-processing coefficients are constructed by an $(8 \times 8)$ matrix and there are eight input data. However, in this embodiment, it is sufficient to dispose a total of 32 multipliers 80 since there are the above-mentioned two divisional sections e and f having zero DCT-processing coefficients and the multiplying operation is performed with respect to only two divisional sections each having nonzero coefficients represented by a $(4 \times 4)$ matrix. Such multipliers 80 are connected to adders 81 (constructed by 24 adders). An adding operation of each of the adders 81 is similar to that of the above-mentioned adder. Since there are the divisional sections e and f having zero DCT-processing coefficients, the adding operation is performed by each of the adders 81 with respect to the data of a $(4 \times 4)$ matrix in each of the remaining two divisional sections except for the divisional sections e and f. Accordingly, the number of required adders 81 is reduced from 56 in the general case to 24. Each of such adders 81 has the same construction as the above-mentioned adder and is connected to a transposition RAM 82. An operation of the transposition RAM 82 is similar to that of the above-mentioned transposition RAM.

The above descritpion relates to a circuit structure with respect to the one-dimensional DCT-processing. Another one-dimensional DCT-processing is further executed to perform the two-dimnensional DCT-processing. To execute this another one-dimensional DCT-processing, the transposition RAM 82 (constructed by 8×8 RAM) is connected to adder/substracters 101 (constructed by 4 adders/subtracters). Each of the adder/subtracters 101 has the same construction as the above-mentioned adder/subtracter and an operation thereof is similar to that of the above-mentioned adder/subtracter. The adder/subtracters 101 are connected to multipliers 83 (constructed by 32 multipliers). Similar to the multipliers 80, the multipliers 83 receive the DCT-processing coefficients including those of the divisional sections e and f. Each of the multipliers 83 has the same construction as each of the multipliers 80 and an operation thereof is similar to that of each of the multipliers 80. The multipliers 83 are connected to adders 84 (constructed by 24 adders). Each of the adders 84 has the same construction as each of the above adders 81 and an operation thereof is similar to that of each of the adders 81.

The circuit structure with respect to the two-dimensional DCT-processing is constructed as above. Similar to the general orthogonal transformation arithmetic unit, an output side of each of the adders 84 is connected to a quantizing circuit 85. An output side of the quantizing circuit 85 is connected to a coding circuit 86 connected to an unillustrated memory.

Figure 13:
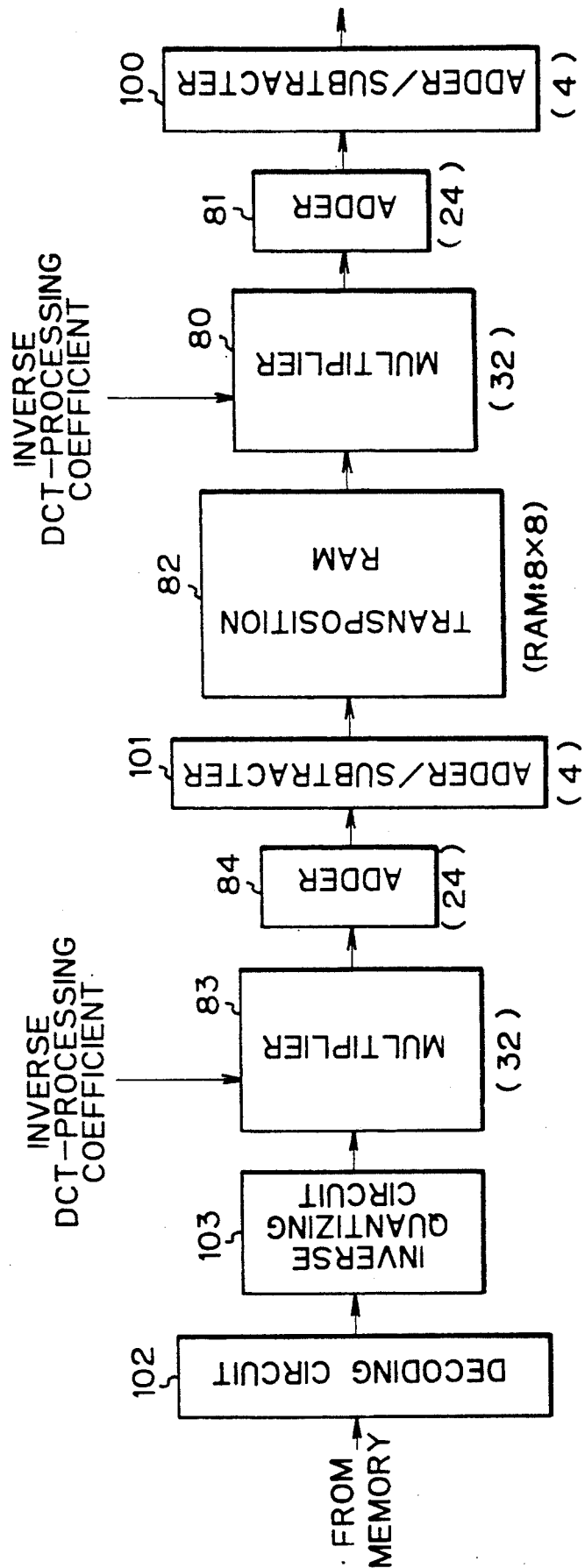
FIG. 13 is a block diagram showing one example of a circuit structure with respect to data extension in the ADCT-processing section shown in FIG. 11.

FIG. 13 shows a circuit for reading compressed data stored to the memory and reproducing an original photographed image. In this circuit, a decoding circuit 102 for decoding the compressed data read out of the memory is connected to an inverse quantizing circuit 103 for performing an inverse quantization. The inverse quantizing circuit 103 is connected to multipliers 83' (constructed by 32 multipliers). The multipliers 83' receive inverse quantizing coefficients. A multiplying operation of each of the multipliers 83' is similar to that of each of the multipliers 83. The multipliers 83' are connected to a transposition RAM 82 through the above adders 84 and the adder/subtracters 101. The transposition RAM 82 is connected to multipliers 80' (constructed by 32 multipliers). The multipliers 80' receive inverse DCT-processing coefficients and a multiplying operation of each of the multipliers 80' is similar to that of each of the above multipliers 80. The multipliers 80' are connected to an unillustrated image display unit through the adders 81 and the adders/subtracters 100.

In the above orthogonal transformation arithmetic unit, a data-compressing operation is similar to that in the general orthogonal transformation arithmetic unit except that the above predetermined adding and subtracting processings are executed by the adders/subtracters 100 and 101 with respect to e.g., the input data $X_{00}$ to $X_{70}$. Therefore, such a data-compressing operation is not described in the following description. A data-extending operation is also similar to that in the general orthogonal transformation arithmetic unit except that the above adding and subtracting operations are executed by the adders/subtractors 101 and 100 with respect to added data provided by the adders 84 and 81. Therefore, such a data-extending operation is not described in the following description.

Some values of the DCT-processing coefficients supplied to the multipliers 80, 83, 80' and 83' can be partially set to zero by performing the predetermined adding and subtracting operations by the adders/subtractors 100 and 101 with respect to the data supplied to these adders/subtracters. It is not necessary to perform the multiplying operation with respect to the zero DCT-processing coefficient values. Accordingly, the number of multipliers can be reduced from 64 in the general case to 32 in a circuit for performing the one-dimensional DCT-processing. Correspondingly, the number of adders can be reduced from 56 in the general case to 24.

Since the number of processings and calculations is reduced, it is possible to greatly reduce a time required to perform the ADCT-processing in comparison with the general processing time.

Figure 11:
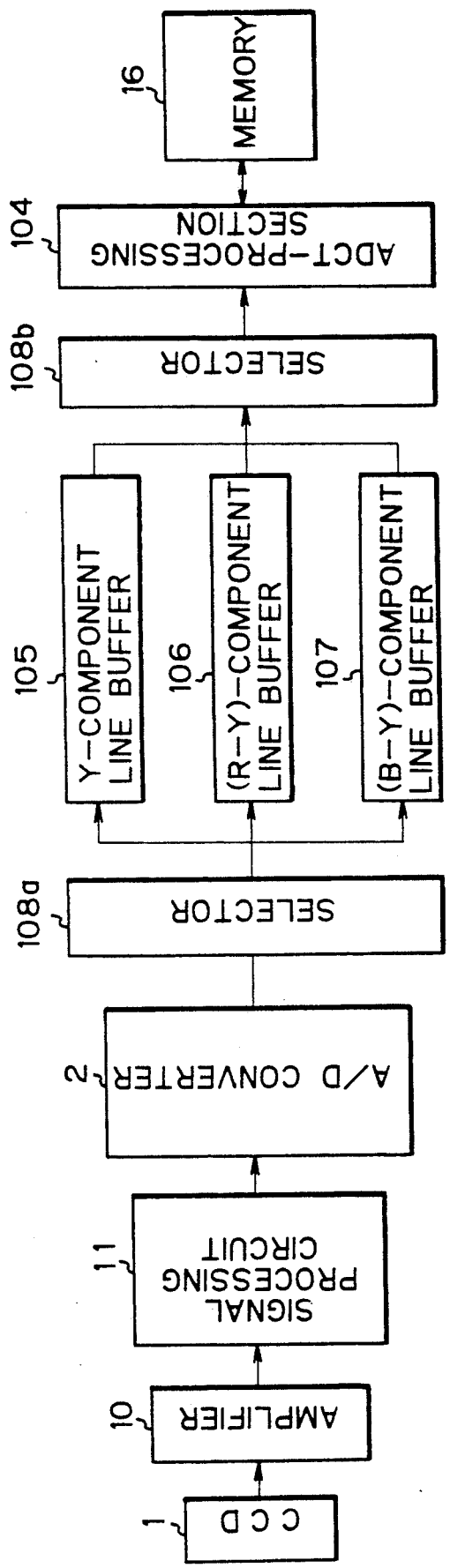
FIG. 11 is a block diagram showing the construction of an orthogonal transformation arithmetic unit in DCT-processing in accordance with a first embodiment of the present invention.

In the general orthogonal transformation arithmetic unit, the processing time in the ADCT-processing section is longer than a processing time from an operation of the charge coupled device 1 to an A/D converting operation. Therefore, as shown in FIG. 2, the buffers 12 to 14 for storing the respective Y, (R-Y) and (B-Y) component data are constructed by page buffers for storing all images with respect to one photographed image. However, the processing time required to perform the ADCT-processing can be set to be equal to or shorter than the processing time from the operation of the charge coupled device 1 to the A/D converting operation for the above-mentioned reasons. Accordingly, as shown in FIG. 11, it is not necessary that the buffers 105 to 107 for respectively storing the Y-component data, the (R-Y)-component data and the (B-Y)-component data transmitted from the A/D converter 2 are constructed by page buffers for storing all images with respect to one photographed image. The buffers 105 to 107 can be constructed by line buffers for storing information corresponding to two block lines of the photographed image in a horizontal direction thereof. In this case, one block line means a line of one of 60 blocks constituting the photographed image in a vertical direction thereof and extending in the horizontal direction of the photographed image. The above line buffers corresponding to the two block lines are required because data can be read out of one buffer when data are inputted to the other buffer. In FIG. 11, the same constructional portions as those in FIG. 2 are designated by the same reference numerals and an explanation thereof is therefore omitted in the following description.

As mentioned above, data stored by the Y-component line buffer 105, the (R-Y)-component line buffer 106 and the (B-Y)-component line buffer 107 are constructed by only data on the two lines so that it is impossible to store data with respect to one photographed image to these line buffers. Accordingly, selectors 108a and 108b for controlling data supplied and transmitted to an ADCT-processing section 104 are connected to input and output sides of the line buffers 105 to 107 so as to continuously perform the DCT-processing. An output side of the selector 108b is connected to the ADCT-processing section 104.

The line buffers 105 to 107 and the selectors 108a and 108b in the above orthogonal transformation arithmetic unit are operated as follows. In FIG. 11, operations of a charge coupled device 1, an A/D converter 2, a memory 16, an amplifier 10 and a signal processing unit 11 are similar to those in the general orthogonal transformation arithmetic unit. Further, the ADCT-processing section 104 is operated as above and a detailed explanation thereof is therefore omitted in the following description.

The Y-component line buffer 105, the (R-Y)-component line buffer 106 and the (B-Y)-component line buffer 107 respectively store Y-component data, (R-Y)-component data and (B-Y)-component data corresponding to two line blocks of a photographed image and supplied from the A/D converter 2. Namely, the line buffers 105 to 107 respectively have buffers for storing data on two lines. Brightness and color information supplied from the A/D converter 2 are transmitted to one of the above buffers corresponding to two lines by a control operation of the selector 108a. While the line buffers 105 to 107 respectively store data of one line block, data of another one line block stored in these line buffers are read out of these line buffers by control operations of the selectors 108a and 108b. Thus, the data are alternately read out of the respective line buffers and are transmitted from the selector 108b to the ADCT-processing unit 104. Similar to the general orthogonal transformation arithmetic unit, these data are transmitted from the selector 108b to the ADCT-processing section 104 every picture element of each image block. The ADCT-processing section 104 performs the ADCT-processing with respect to one kind of supplied component data. When this ADCT-processing processing is completed, the ADCT-processing section 104 executes the ADCT-processing with respect to the next component data. The selector 108b transmits the component data in accordance with the ADCT-processing of the ADCT-processing section 104.

The above line buffers 105 to 107 and the above selectors 108a and 108b are operated only in the case of data compression and are not operated at the time of reproducing processing of the compressed data. The operation of the orthogonal transformation arithmetic unit at a data-extending time is similar to that of the above general orthogonal transformation arithmetic unit and an explanation thereof is therefore omitted in the following description.

As mentioned above, the orthogonal transformation arithmetic unit in this embodiment can reduce a time required to perform the ADCT-processing. Further, the buffers for storing the Y-component data, the (R-Y)-component data and the (B-Y)-component data can be changed from page buffers to line buffers by the reduction of the ADCT-processing time. Accordingly, for example, a total of memory capacities of the above line buffers and the transposition RAM 82 is set to 0.2M bits so that it is possible to reduce the total memory capacity to about 1/40 time in comparison with the memory capacity in the general orthogonal transformation arithmetic unit. Accordingly, the size of a circuit structure of the orthogonal transformation arithmetic unit can be greatly reduced.

The DCT-processing is described in the above embodiment, but the orthogonal transformation arithmetic unit is similarly constructed in the cases of the DST processing and the IDCT-processing.

An orthogonal transformation arithmetic unit in accordance with a second embodiment of the present invention will next be described.

Figure 17:
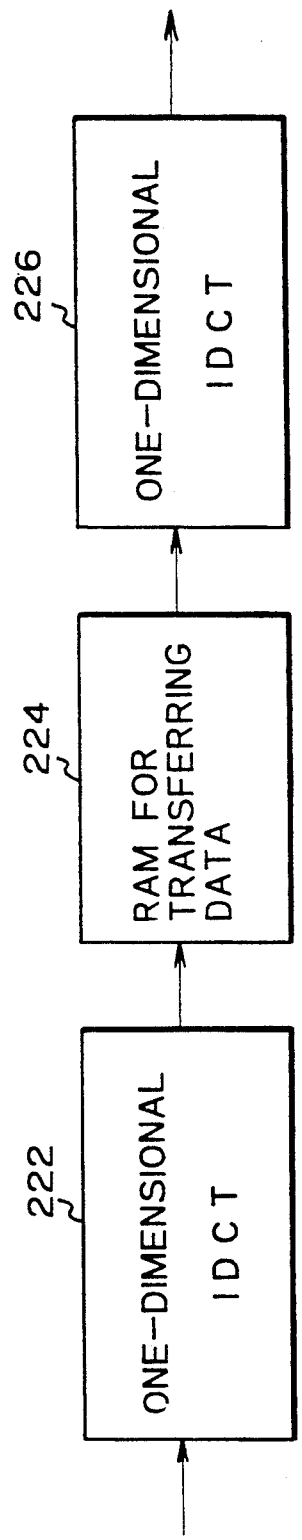
FIG. 17 is a block diagram showing IDCT-processing in the second embodiment of the present invention.

The data of a reproduced image are reduced or enlarged at an executing time of two-dimensional IDCT-processing. Similar to the two-dimensional DCT-processing described in the above first embodiment, this two-dimensional IDCT-processing can be performed by continuously executing one-dimensional IDCT-processing with respect to rows and columns. In FIG. 17, reference numerals 222 and 226 designate one-dimensional IDCT-processing circuits. The one-dimensional IDCT-processing is performed by the one-dimensional IDCT-processing circuit 222 in a row (or column) direction. These IDCT-processed results are temporarily held in a RAM 224 for transferring data. Subsequently, the one-dimensional IDCT-processing is performed by the one-dimensional IDCT-processing circuit 226 in the column (or row) direction.

In the case of the two-dimensional DCT processing, this two-dimensional DCT-processing is performed by performing the one-dimensional DCT-processing with respect to index i after the one-dimensional DCT-processing with respect to index j is performed in the above-mentioned formula (1). In the case of image data size $N=8$ in which one image block is constructed by $(8 \times 8)$ picture elements as mentioned above, one-dimensional DCT arithmetic formula is transformed into a vector calculating formula and is represented by the following matrix (8).

$$\begin{bmatrix} Z_0 \\ Z_2 \\ Z_4 \\ Z_6 \\ Z_1 \\ Z_3 \\ Z_5 \\ Z_7 \end{bmatrix} = \begin{bmatrix} 1 & 1 & 1 & 1 & 1 & 1 & 1 & 1 \\ \beta & -\delta & -\beta & \delta & \delta & -\beta & -\delta & \beta \\ \alpha & -\alpha & \alpha & -\alpha & -\alpha & \alpha & -\alpha & \alpha \\ \delta & \beta & -\delta & -\beta & -\beta & -\delta & \beta & \delta \\ \lambda & \mu & -\nu & -\gamma & \gamma & \nu & -\mu & -\lambda \\ \gamma & -\lambda & \mu & \nu & -\nu & -\mu & \lambda & -\gamma \\ \mu & \nu & -\gamma & \lambda & -\lambda & \gamma & -\nu & -\mu \\ \nu & \gamma & \lambda & \mu & -\mu & -\lambda & -\gamma & -\nu \end{bmatrix} \begin{bmatrix} x_0 \\ x_2 \\ x_4 \\ x_6 \\ x_1 \\ x_3 \\ x_5 \\ x_7 \end{bmatrix} \quad (8)$$

Here,
$\alpha = \cos(2/8)\pi$
$\beta = \cos(1/8)\pi$
$\delta = \sin(1/8)\pi$
$\lambda = \cos(1/16)\pi$
$\mu = \sin(3/16)\pi$
$\gamma = \cos(3/16)\pi$
$\nu = \sin(1/16)\pi$ Similarly, the two-dimensional IDCT-processing is performed by performing the one-dimensional IDCT-processing with respect to index U after the one-dimensional IDCT-processing with respect to index V is performed in the above-mentioned formula (4). In the case of the image data size $N=8$, a one-dimensional IDCT arithmetic formula is represented by the following matrix (9) as a vector calculating formula.

$$\begin{bmatrix} x_0 \\ x_2 \\ x_4 \\ x_6 \\ x_1 \\ x_3 \\ x_5 \\ x_7 \end{bmatrix} = \begin{bmatrix} 1 & \beta & \alpha & \delta & \lambda & \gamma & \mu & \nu \\ 1 & -\delta & -\alpha & \beta & \mu & \lambda & \nu & \gamma \\ 1 & -\beta & \alpha & -\delta & -\nu & \mu & -\gamma & \lambda \\ 1 & \delta & -\alpha & -\beta & -\gamma & \nu & \lambda & \mu \end{bmatrix} \begin{bmatrix} Z_0 \\ Z_2 \\ Z_4 \\ Z_6 \end{bmatrix} \quad (9)$$

$$\begin{bmatrix} 1 & \delta & -\alpha & -\beta & \gamma & \nu & -\lambda & -\mu \\ 1 & -\beta & \alpha & -\delta & \nu & -\mu & \gamma & -\lambda \\ 1 & -\delta & -\alpha & \beta & -\mu & \lambda & -\nu & -\gamma \\ 1 & \beta & \alpha & \delta & -\lambda & -\gamma & -\mu & -\nu \end{bmatrix} \begin{bmatrix} Z_1 \\ Z_3 \\ Z_5 \\ Z_7 \end{bmatrix}$$

Figure 18:
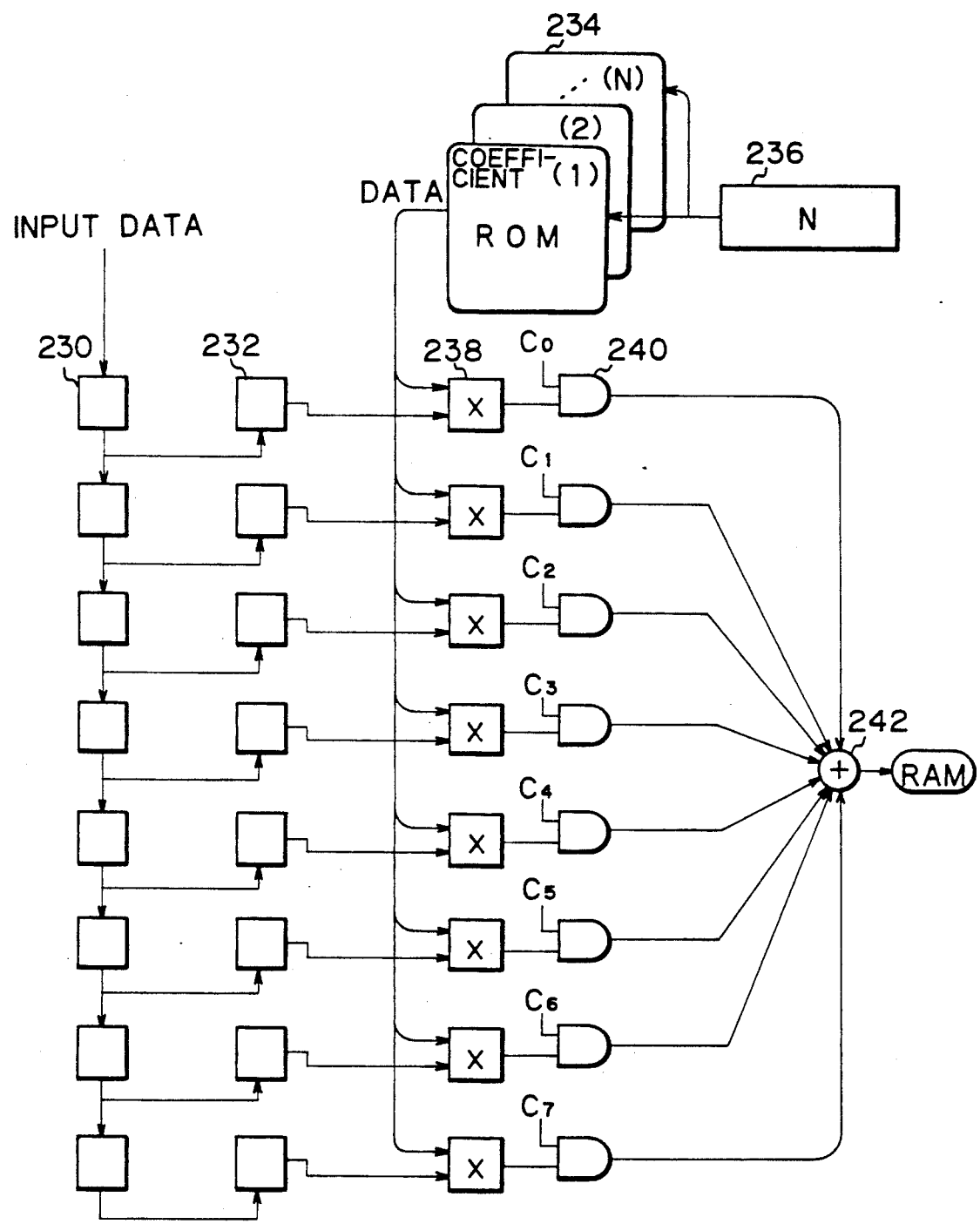
FIG. 18 is a block diagram showing one example of a one-dimensional IDCT-processing circuit.

FIG. 18 shows one example of the one-dimensional IDCT-processing circuit 222 or 226 shown in FIG. 17 and performing the one-dimensional IDCT-processing for providing one data.

This example is an example of the one-dimensional IDCT-processing with respect to DCT-processed data of the original image in a block unit of (8×8) picture elements when a size of these picture elements is reduced or enlarged to that of (N×N) picture elements or is not changed. N>8 shows enlargement, N<8 reduction and N=8 shows the same size.

A shift register 230 shifts data on one line including eight data each constructed by e.g., 8 bits. Input data of the shift register 230 are constructed by transformation data Huffman-decoded and inversely quantized in the one-dimensional IDCT-processing circuit 222. In the one-dimensional IDCT-processing circuit 226, the input data of the shift register 230 are data provided by the one-dimensional IDCT-processing in a row (or column) direction in the one-dimensional IDCT-processing circuit 222 and held in a RAM 224. Latch circuits 232 hold the data shifted by the shift register 230.

Coefficient ROMs 234 hold IDCT-transformation coefficients in accordance with the block size N of a reproduced image. A register 236 is disposed to designate the block size N of the reproduced image. Each of multipliers 238 performs a multiplying operation with respect to data of the latch circuits 232 and the IDCT-transformation coefficients selected from the coefficient ROMs 234 by the designated size N. Outputs of the respective multipliers 238 are added to each other by an adder 242 through AND gate circuits 240 and the added results are transmitted to the RAM 224. The AND gate circuits 240 receive signals $C_0$ to $C_7$ for switching validation and invalidation of the multiplied results of the respective multipliers 238. These signals $C_0$ to $C_7$ are designated by the reproduced image size N.

The operation of the orthogonal transformation arithmetic unit shown in FIG. 18 will next be described.

The reproduced image data size N is inputted to the register 236. Eight input data are shifted by the shift register 230. When the eight input data are shifted by the shift register 230, these input data are temporarily held by the latch circuits 232. The coefficient ROMs 234 select IDCT-transformation coefficients in accordance with the reproduced image data size N. The multipliers 238 perform the multiplying operation with respect to the data held in the latch circuits 232 and the IDCT-transformation coefficients selected by the coefficient ROMs 234.

In the case of N≧8, all voltage levels of the signals $C_0$ to $C_7$ in the AND gate circuits 240 become high. Accordingly, all products of the multipliers 238 are outputted and added to each other by the adder 242, thereby outputting one calculated data therefrom. In contrast to this, the size N is smaller than 8 in a reducing case. For example, when the size N is equal to 7, a voltage level of the validation/invalidation switching signal $C_0$ becomes low so that products of seven data on a low frequency component side are transmitted to the adder 242 and are added to each other by this adder 242.

With respect to the data held in the latch circuits 232, the IDCT-transformation coefficients of the image data size N are sequentially transmitted to the multipliers 238. Then, a number of products in accordance with the image data size N are added to each other by the adder 242 and the added results are transmitted to the RAM 224. Such operations are repeatedly performed by N times.

Next, the input data are changed and the above-mentioned processing is repeatedly performed by N times with respect to each of the input data. Such a repetitious processing is continuously performed until there are no input data left.

As mentioned above, in accordance with the orthogonal transformation arithmetic unit in the second embodiment, it is possible to simultaneously perform reducing and enlarging processings in the inverse DCT-processing.

An orthogonal transformation arithmetic unit in a third embodiment of the present invention will next be described.

Figure 19:
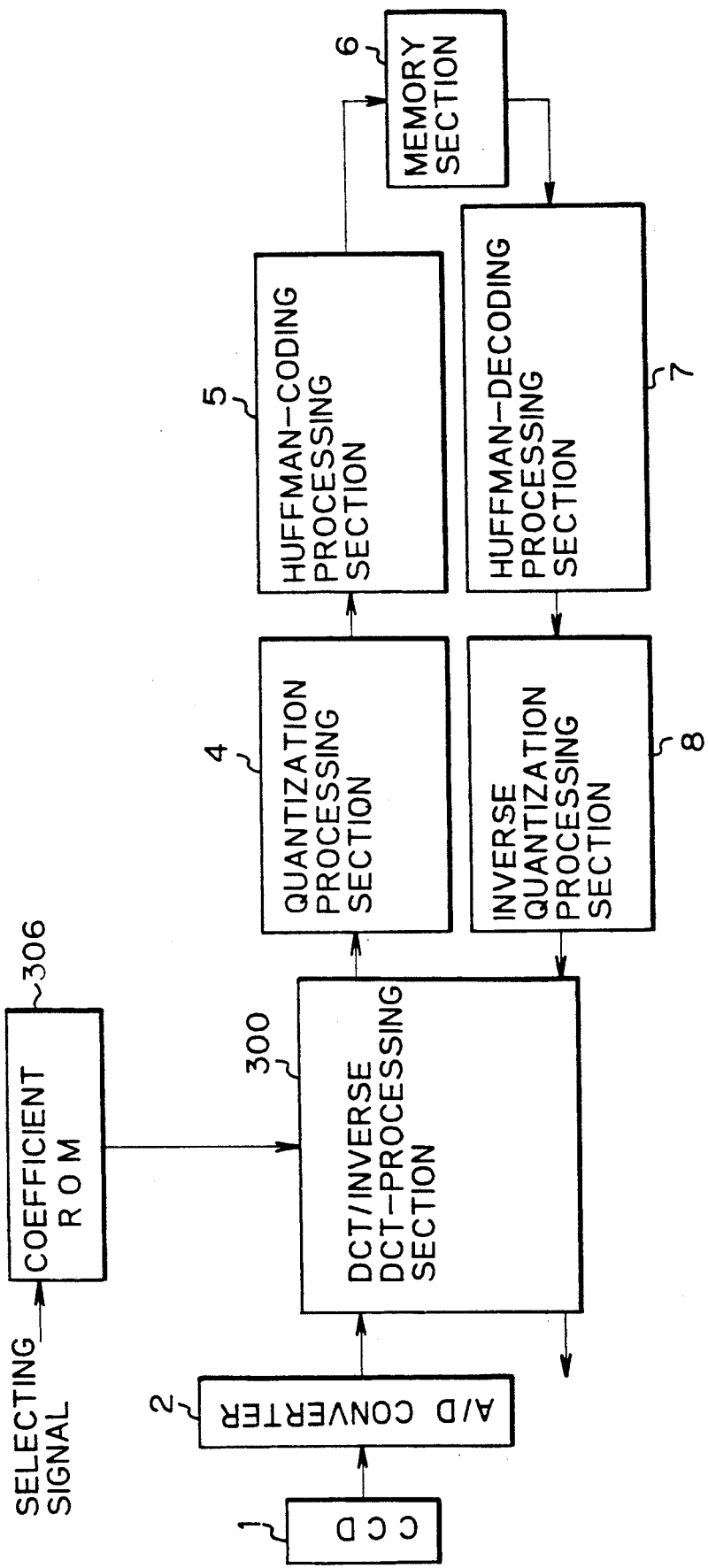
FIG. 19 is a block diagram showing the construction of an orthogonal transformation arithmetic unit in accordance with a third embodiment of the present invention.

FIG. 19 shows an orthogonal transformation arithmetic unit for performing DCT/inverse DCT-processings in the third embodiment of the present invention. In FIG. 19, the same constructional portions as those in FIG. 1 are designated by the same reference numerals.

As can be seen from FIGS. 19 and 1, in a DCT/inverse DCT processor in this embodiment, the DCT-processing section and the inverse DCT-processing section in the general DCT/inverse DCT processor shown in FIG. 1 is constructed by a single DCT/inverse DCT-processing section 300. The DCT/inverse DCT-processing section 300 is constructed by a circuit for executing the DCT-processing or the inverse DCT-processing based on DCT-transformation coefficients or inverse DCT-transformation coefficients selected and outputted from a coefficient ROM 306 by a selecting signal transmitted from the exterior of the DCT/inverse DCT-processing section 300. The other constructions are similar to those shown in FIG. 1 and an explanation thereof is therefore omitted in the following description.

As described in the above first embodiment, in FIG. 21, image data are sequentially converted to digital data in an order of $X_{00}, X_{10}, X_{20}, ---, X_{70}$ and are transmitted to a serial/parallel converter (called an S/P converter in the following description) 331 disposed in the DCT-processing section. The S/P converter 331 transmits these eight digital image data in parallel with each other to a register 332 when the digital image data in a first column shown in FIG. 4 are stored to the S/P converter 331. The digital image data stored to the register 332 are set to X0 to X7.

With respect to these digital image data X0 to X7 stored to the register 332, an A-circuit 333 calculates values (X0+X7), (X1+X6), (X2+X5), (X3+X4), (X3−X4), (X2−X5), (X1−X6) and (X0−X7). The calculated values are respectively supplied to eight multipliers 334a constituting a main arithmetic circuit 334. The respective multipliers 334a perform a multiplying operation with respect to the above calculated values and DCT-transformation coefficients supplied to these multipliers 334a. The multiplied values are transmitted to an adder group 334b. The adder group 334b adds the multiplied values to each other and these added values Z0, Z2, Z4, Z6, Z1, Z3, Z5 and Z7 are transmitted to a B-circuit 335.

The B-circuit 335 rearranges the above added values in an order from Z0 to Z7 and the rearranged values are transmitted and stored to a register 336. A matrix for transforming the data X0 to X7 stored to the register 332 to the data Z0 to Z7 is provided as the above matrix (6). In this matrix (6), the DCT-transformation coefficients are represented by matrix elements a, −a, etc.

The above description relates to first one-dimensional DCT-processing with respect to the two-dimensional DCT-processing. It is necessary to perform second one-dimensional DCT-processing similar to the first one-dimensional DCT-processing so as to perform the two-dimensional DCT-processing with respect to the entire image. Accordingly, the above data Z0 to Z7 are further DCT-processed and are transformed to data Y0 to Y7. Similar to the above DCT-processing section 3, an inverse DCT-processing section 9 is disposed to perform two-dimensional inverse DCT-processing by performing one-dimensional inverse DCT-processing twice. FIG. 22 shows a circuit structure for performing this one-dimensional inverse DCT-processing. In FIG. 22, the same constructional portions as those in FIG. 21 are designated by the same reference numerals.

For example, a register 392 stores data $Y_{00}$ to $Y_{70}$ transmitted from an S/P converter 391 as data Y0 to Y7. The register 392 then outputs these data Y0 to Y7 to multipliers 334a constituting a main arithmetic circuit 334 through a C-circuit 393. The C-circuit 393 is a circuit for controlling whether the respective data Y0 to Y7 outputted in parallel with each other from the register 392 are transmitted to any of seven multipliers 334a constituting the main arithmetic circuit 334. An operation of the main arithmetic circuit 334 is similar to that described in the case of the above DCT-processing. Data outputted from the main arithmetic circuit 334 are transmitted to the register 336 through the above A-circuit 333. Thus, the first inverse DCT-processing is completed and the same inverse DCT-processing is executed again, thereby completing the two-dimensional inverse DCT-processing.

Figure 20:
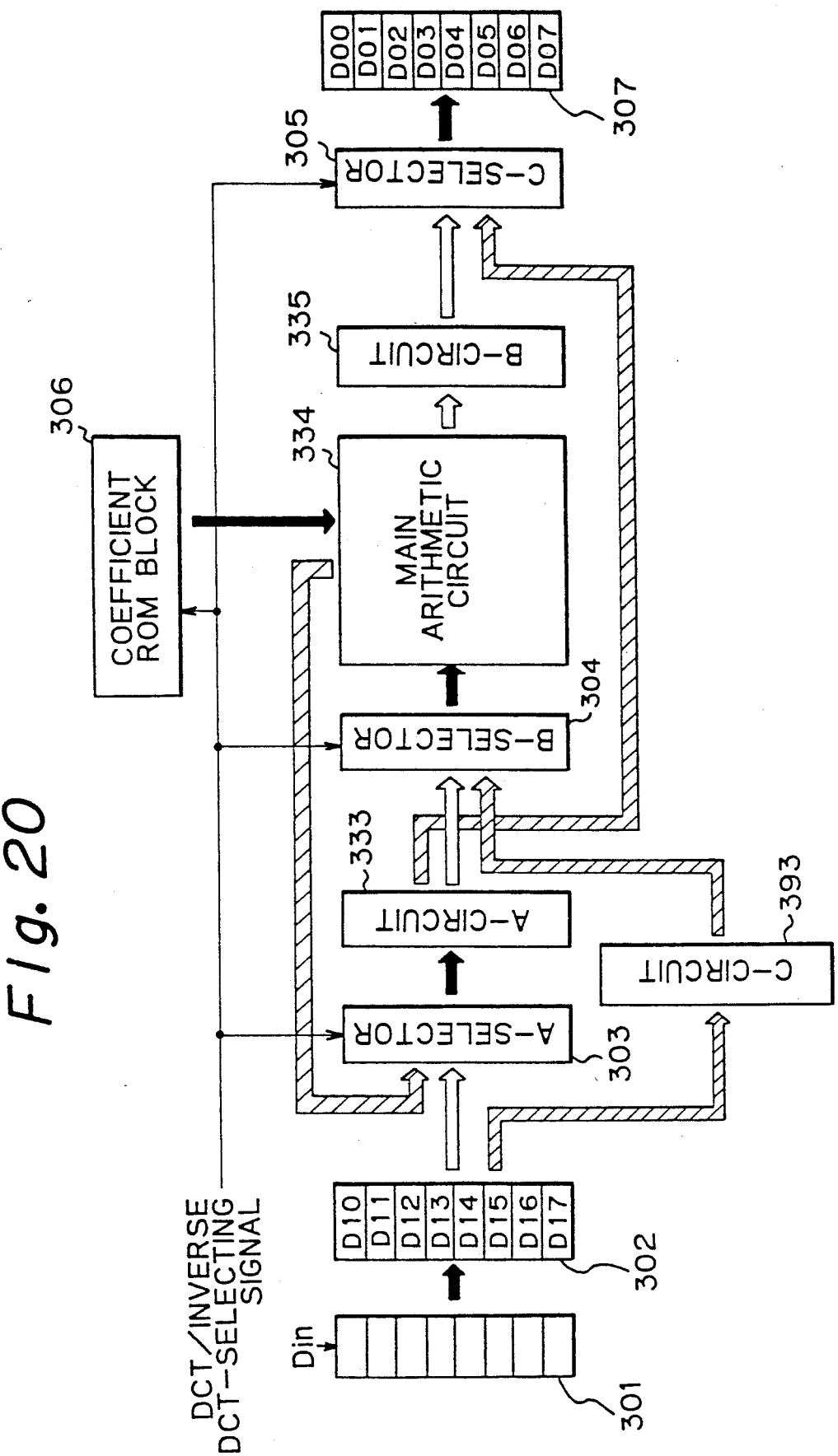
FIG. 20 is a block diagram showing one example of the construction of a DCT/inverse DCT-processing section shown in the orthogonal transformation arithmetic unit shown in FIG. 19.
Figure 21:
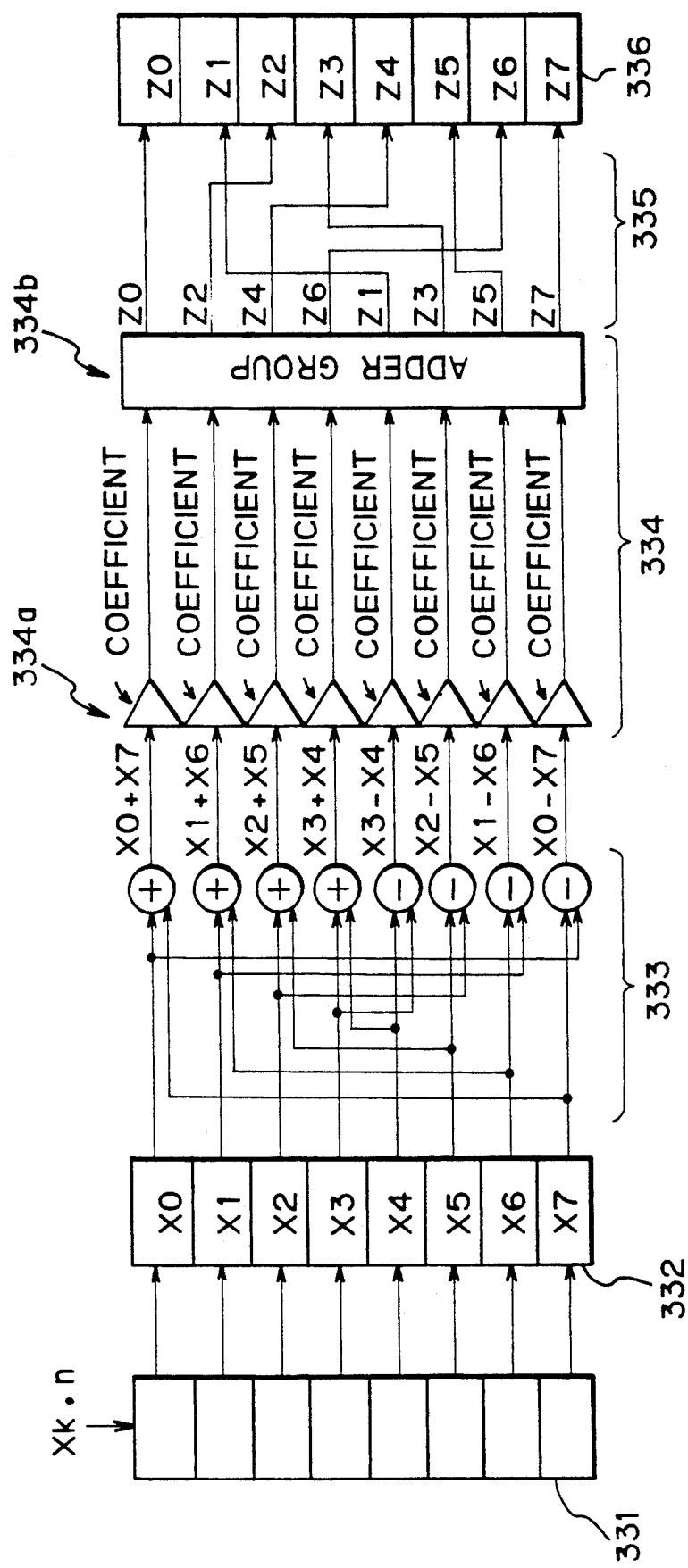
FIG. 21 is a block diagram showing the construction of a DCT-processing section shown in FIG. 20.
Figure 22:
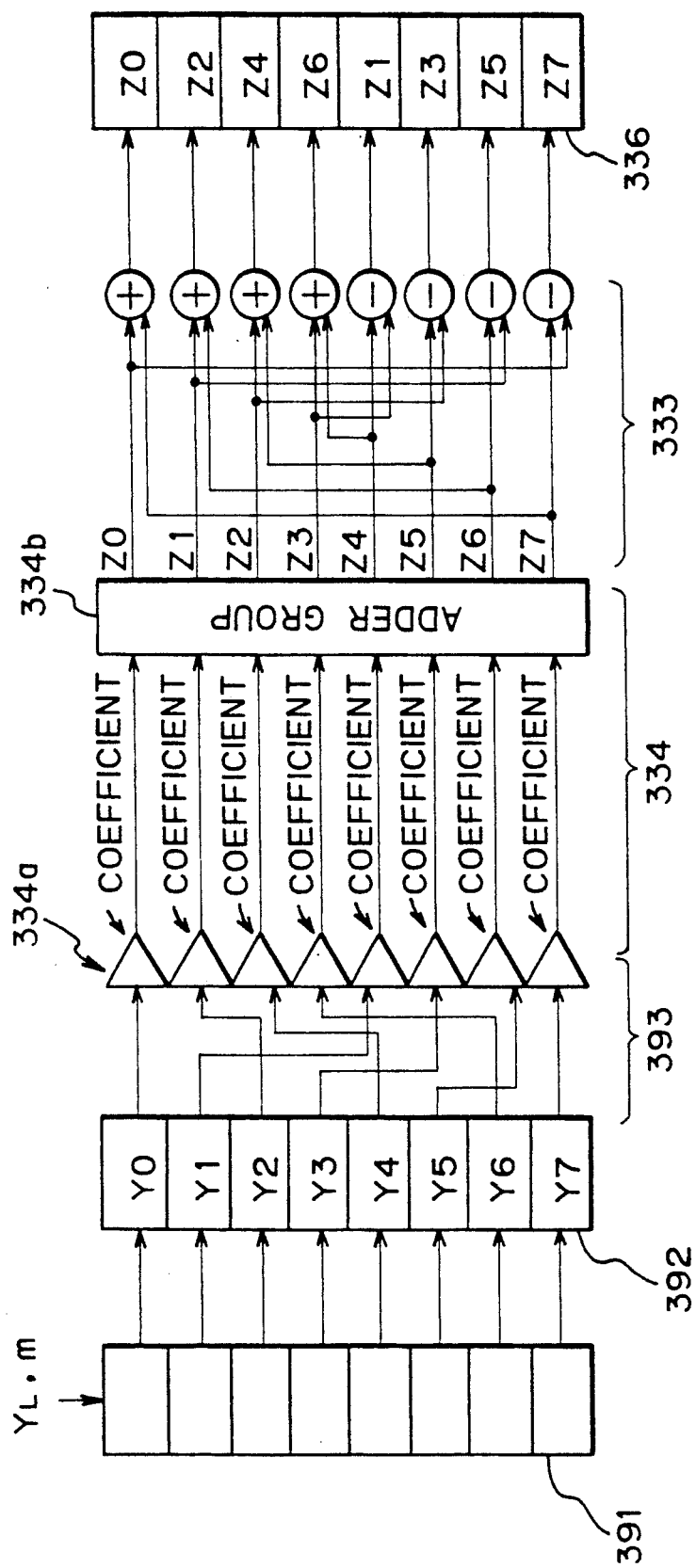
FIG. 22 is a block diagram showing the construction of an inverse DCT-processing section shown in FIG. 20.

FIG. 20 shows one constructional example of the DCT/inverse DCT-processing section 300 and also shows constructional portions for performing the DCT-processing and the inverse DCT-processing corresponding to FIGS. 21 and 22. In FIG. 20, the same constructional portions as those in FIGS. 21 and 22 are designated by the same reference numerals.

As prescribed by the Joint Photographic Export Group, one unit of blocks constituting an image is constructed by (8×8) picture elements. In FIG. 20, an S/P converter 301 is disposed to process input data constructed by eight bits. In the case of the DCT-processing, image data converted to digital data by an A/D converter 2 are serially supplied to the S/P converter 301. In contrast to this, in the case of the inverse DCT-processing, image data $A_{ij}$ are serially supplied from an inverse quantization processing section 8 to the S/P converter 301. When the S/P converter 301 stores the input data constructed by eight bits, these stored data are outputted in parallel with each other from the S/P converter 301 to an input register 302.

An output side of the input register 302 is connected to an A-selector 303 and the C-circuit 393 described with reference to FIG. 22. An input side of the A-selector 303 is connected to an output side of a main arithmetic circuit 334 described later. Contacts of the A-selector 303 are switched to the input register 302 at a DCT-processing time and are switched to the main arithmetic circuit 334 at an inverse DCT-processing time by a selecting signal transmitted from the exterior of the A-circuit 303 and indicating the DCT-processing or the inverse DCT-processing.

An output side of the A-selector 303 is connected to a B-selector 304 through the A-circuit 333 described with reference to FIGS. 21 and 22. An output side of the C-circuit 393 is also connected to the B-selector 304. An output side of the A-circuit 333 is connected to a C-selector 305.

Similar to the above A-selector 303, the above selecting signal is transmitted to the B-selector 304. Contacts of the B-selector 304 are switched to the A-circuit 333 at the DCT-processing time and are switched to the C-circuit 393 at the inverse DCT-processing time. An output side of the B-selector 304 is connected to the main arithmetic circuit 334 constructed by the multipliers 334a and the adder group 334b mentioned above. The main arithmetic circuit 334 is connected to an output side of a coefficient ROM block 306. This coefficient ROM block 306 stores DCT-transformation coefficients and inverse DCT-transformation coefficients. The coefficient ROM block 306 outputs the DCT-transformation coefficients or the inverse DCT-transformation coefficients selected in accordance with the DCT-processing time or the inverse DCT-processing time to the above multipliers 334a by receiving the above selecting signal.

An output side of this main arithmetic circuit 334 is connected to the A-selector 303 and the B-circuit 335 described with reference to FIG. 21. An output side of the B-circuit 335 is connected to the C-selector 305. Similar to the above A-selector 303 and the above B-selector 304, contacts of the C-selector 305 are switched to the B-circuit 335 at the DCT-processing time and are switched to the A-circuit 333 at the inverse DCT-processing time by the selecting signal supplied to this C-selector 305. An output side of this C-selector 305 is connected to an output register 307 constructed by eight bits.

Similar to the DCT-processing section 3 and the inverse DCT-processing section 9 shown in FIGS. 21 and 22, the circuit structure for performing the DCT/inverse DCT-processing shown in FIG. 20 performs one-dimensional DCT/inverse DCT-processings.

The operation of the DCT/inverse DCT processor having such a DCT/inverse DCT-processing section 300 will next be described. In FIG. 20, a white thick arrow shows an information flow at the DCT-processing time. A thick arrow shown by hatching in FIG. 20 shows an information flow at the inverse DCT-processing time. A black thick arrow shows an information flow at both the DCT-processing time and the inverse DCT-processing time. When the DCT-processing is performed, image information is converted to an electric signal by the charge coupled device 1 and this electric signal is converted to a digital signal by the A/D converter 2. The digitally converted image information is then supplied to the S/P converter 301 constituting the DCT/inverse DCT-processing section 300. When the image information constructed by eight bits are stored to the S/P converter 301, this image information is outputted from the S/P converter 301 to the input register 302.

The input register 302 outputs input data D10 to D17 stored thereto to the A-selector 303 and the C-circuit 393. The contacts of the A-selector 303 are connected to the input register 302 by a selecting signal since the DCT-processing is executed at the present time. Accordingly, the A-selector 303 outputs the supplied input data D10 to D17 to the A-circuit 333. The A-circuit 333 performs predetermined adding and substracting operations with respect to the supplied input data D10 to D17 and outputs the added and substracted data to the B-selector 304.

The input data D10 to D17 supplied to the C-circuit 393 are rearranged in a predetermined order and are then supplied to the subsequent B-selector 304.

The selecting signal indicative of the DCT-processing is transmitted to the B-selector 304. Accordingly, the contacts of the B-selector 304 are switched to the A-circuit 333 so that the above added and subtracted data supplied from the A-circuit 333 are transmitted to the main arithmetic circuit 334. Transformation coefficients for performing the DCT-processing are supplied by the selecting signal to the main arithmetic circuit 334 from the coefficient ROM block 306. Thus, the main arithmetic circuit 334 performs a processing operation similar to that in the general orthogonal transformation arithmetic unit and outputs processed data to the B-circuit 335 and the A-selector 303. As mentioned above, the selecting signal indicative of the DCT-processing is transmitted to the A-selector 303. Accordingly, the contacts of the A-selector 303 are switched to the input register 302 so that no processed data transmitted from the main arithmetic circuit 334 are selected.

The B-selector 335 rearranges an order of the processed data supplied from the main arithmetic circuit 335 and outputs the rearranged data to the C-selector 305. The selecting signal indicative of the DCT-processing is transmitted to the C-selector 305. Accordingly, the contacts of the C-selector 305 are switched to the B-circuit 335 and the data supplied to the C-selector 305 are transmitted to the output register 307.

The output register 307 outputs the stored data to the subsequent quantization processing section 4. The quantization processing section 4 performs the above predetermined quantizing operation with respect to the data supplied thereto. The quantized data are transmitted from the quantization processing section 4 to the Huffman-coding processing section 5. The Huffman-coding processing section 5 performs a predetermined Huffman-coding operation with respect to the quantized data, thereby compressing the data.

The inverse DCT-processing will next be described.

Compressed data are decoded by the Huffman-decoding processing section 7 and are inversely quantized by the inverse quantization processing section 8 (see FIG. 19). The inversely quantized data are supplied to the S/P converter 301 constituting the DCT/inverse DCT-processing section 300 and are then transmitted to the input register 302 from the S/P converter 301. The input register 302 transmits the stored data to the A-selector 303 and the C-circuit 393. A selecting signal indicative of the inverse DCT-processing is transmitted to the A-selector 303. Accordingly, the contacts of the A-selector 303 are switched to the main arithmetic circuit 334. However, no data are supplied from the main arithmetic circuit 334 to the A-selector 303 at the present time. The C-circuit 393 performs an operation similar to the above-mentioned operation and transmits processed data thereof to the B-selector 304. The contacts of the B-selector 304 are switched to the C-circuit 393 by the selecting signal indicative of the inverse DCT-processing. Accordingly, the B-selector 304 transmits the data transmitted from the C-circuit 393 to the main arithmetic circuit 334.

Transformation coefficients required to perform the inverse DCT-processing are supplied to the main arithmetic circuit 334 from the coefficient ROM block 306 by the selecting signal indicative of the inverse DCT-processing. The main arithmetic circuit 334 performs a predetermined operation with respect to the transformation coefficients and transmits output image information to the A-selector 303 and the B-circuit 335.

At this time, the A-selector 303 transmits the above supplied image information to the A-circuit 333. The A-circuit 333 performs predetermined adding and subtracting processings with respect to the image information and transmits processed data to the C-selector 305. The above image information transmitted from the main arithmetic circuit 334 is supplied to the C-selector 305 through the B-circuit 335. However, the contacts of the C-selector 305 are switched to the A-circuit 333 by the selecting signal indicative of the inverse DCT-processing. Accordingly, the above image information supplied from the A-circuit 333 is transmitted to the output register 307.

Figure 23:
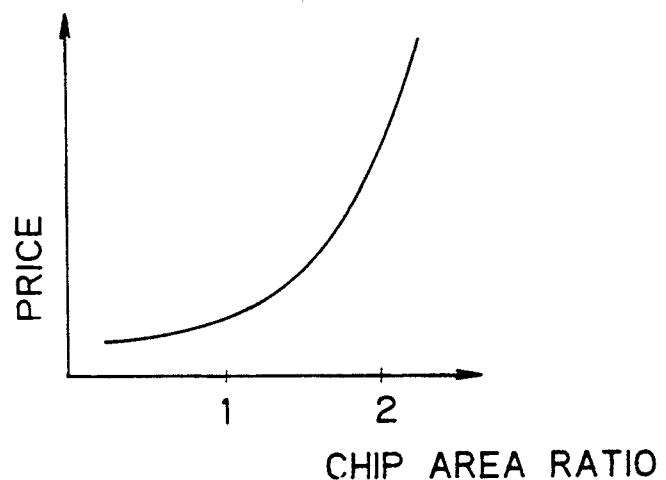
FIG. 23 is a graph showing the relation between an area ratio of a circuit chip and a price thereof.

As mentioned above, in a general main arithmetic circuit section disposed in the DCT-processing section 3 and the inverse DCT-processing section 9, the transformation coefficients supplied to the multipliers in the DCT-processing are different from those in the inverse DCT-processing. However, circuit structures in the DCT-processing and the inverse DCT-processing are equal to each other. The orthogonal transformation arithmetic unit in the third embodiment has the A-selector 303, the B-selector 304 and the C-selector 305 so that it is sufficient to dispose a single main arithmetic circuit section amounting to about 90% of a semiconductor circuit in the DCT/inverse DCT processor. The single main arithmetic circuit 334 performs both the DCT-processing and the inverse DCT-processing. Therefore, it is possible to greatly reduce the size of a circuit structure of the entire DCT/inverse DCT processor. Thus, it is possible to reduce an area for a chip of the semiconductor circuit constituting the DCT/inverse DCT processor. FIG. 23 shows the relation between an area ratio and a chip price with respect to two semiconductor circuits having chip areas different from each other. As shown in FIG. 23, there is no great difference between the chip prices when the area ratio is less than one. However, when the area ratio exceeds one, the chip price is increased exponentially. In the general DCT/inverse DCT processor, the chip of the semiconductor circuit has about 13 mm in each of longitudinal and transversal lengths. In contrast to this, in the DCT/inverse DCT processor in the third embodiment of the present invention, the chip of the semiconductor circuit has about 9 mm in each of the longitudinal and transversal lengths so that the area ratio is set to about 2. Accordingly, the cost of the DCT/inverse DCT processor in the third embodiment can be greatly reduced in comparison with that of the general DCT/inverse DCT processor.

An orthogonal transformation arithmetic unit in a fourth embodiment of the present invention will next be described.

The orthogonal transformation arithmetic unit in this fourth embodiment is an orthogonal transformation arithmetic unit using DCT-processing with respect to a color still image. In this orthogonal transformation arithmetic unit, an operator first sets the number of sheets of the color still image to be stored as information. Thus, a quantizing coefficient $\alpha$ is automatically determined in accordance with a memory capacity per one sheet of the color still image and a compressing operation with respect to the color still image is performed by using this quantizing coefficient $\alpha$. A quality of the stored image is predicted by a compressibility calculated on the basis of this quantizing coefficient $\alpha$ and these predicted results are visually displayed. Such an orthogonal transformation arithmetic unit in the fourth embodiment can be added to the general orthogonal transformation arithmetic unit. Further, the orthogonal transformation arithmetic unit in the fourth embodiment can be also added to the orthogonal transformation arithmetic unit for performing the orthogonal transformation processing at a high speed in each of the first to third embodiments.

Figure 24:
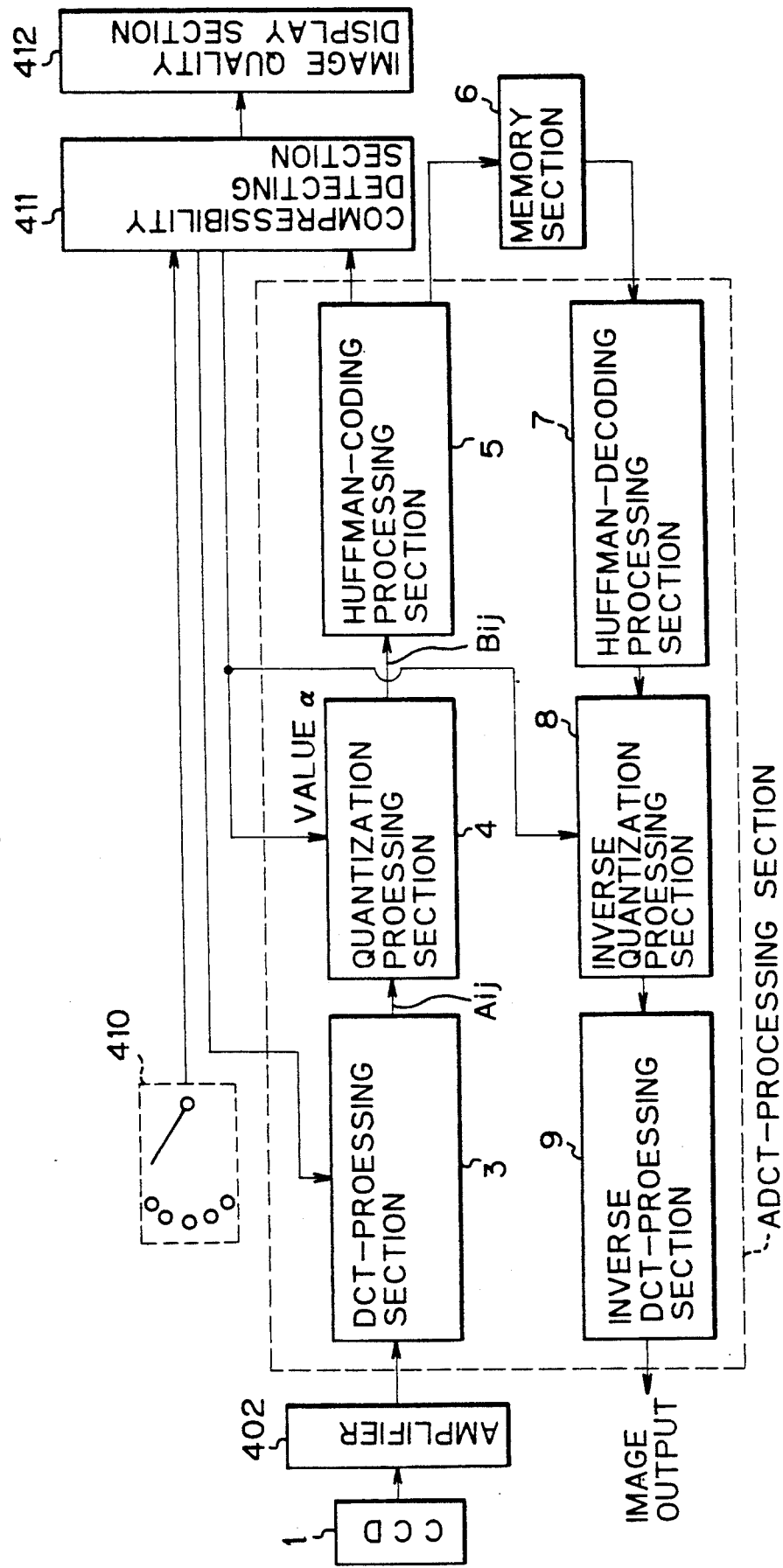
FIG. 24 is a block diagram showing the construction of an orthogonal transformation arithmetic unit in accordance with a fourth embodiment of the present invention.

FIG. 24 shows the construction of the orthogonal transformation arithmetic unit in the fourth embodiment of the present invention. In FIG. 24, image information is converted to an electric signal by a charge coupled device 1 and is amplified by an amplifier 402. A DCT-processing section 3 performs DCT-processing with respect to this image information. The DCT-processing section 3 is connected to a quantization processing section 4. The quantization processing section 4 quantizes image data $A_{ij}$ transmitted from the DCT-processing section 3 by the number of sheets of the stored image set by a change-over switch 410 for switching the number of sheets of the stored image, and the quantizing coefficient $\alpha$ calculated and transmitted by a compressibility detecting section 411 based on the memory capacity of a memory section 6. For example, the change-over switch 410 has several kinds of switching contacts for respectively setting predetermined numbers of sheets of the stored image. When an operator selects these switching contacts of the change-over switch 410, it is possible to change the number of sheets of the image storable to the memory section 6 disposed in the color still image orthogonal transformation arithmetic unit. An output side of the change-over switch 410 is connected to the compressibility detecting section 411.

An output side of the quantization processing section 4 is connected to the above-mentioned Huffman-coding processing section 5. The Huffman-coding processing section 5 is connected to the compressibility detecting section 411 and the memory section 6 for storing compressed image data.

As mentioned above, the Huffman-coding processing section 5 performs a Huffman-coding operation and calculates a total of compressed data amounts in one block of a photographed image.

The compressibility detecting section 411 receives a signal indicative of the number n of sheets of the image manually selected by the change-over switch 410. The compressibility detecting section 411 divides a memory capacity M of the memory section 6 stored in advance by the above number n of sheets of the image. Thus, the compressibility detecting section 411 calculates a memory capacity P $(=M/n)$ required per one sheet of the stored image. It is necessary to suitably change the quantizing coefficient $\alpha$ by trial and error so as to judge whether or not the total compressed data amount per one image sheet lies within the above memory capacity P. Accordingly, the compressibility detecting section 411 transmits a control signal to the DCT-processing section 3 so as to transmit image data of only one block of a central image portion before the quantizing operation is performed with respect to the entire image. Thus, a total value of the compressed data amounts in one block of the photographed image supplied from the Huffman-coding processing section 5 is increased by 5400 times by the compressibility detecting section 411 since one image is constructed by 5400 blocks. The quantizing coefficient $\alpha$ is suitably changed such that this multiplied value is equal to the above memory capacity P or is most close to this memory capacity P within a range thereof, thereby determining an optimum value of the quantizing coefficient $\alpha$. The compressibility detecting section 411 transmits this determined optimum value $\alpha$ to the quantization processing section 4.

Figure 25:
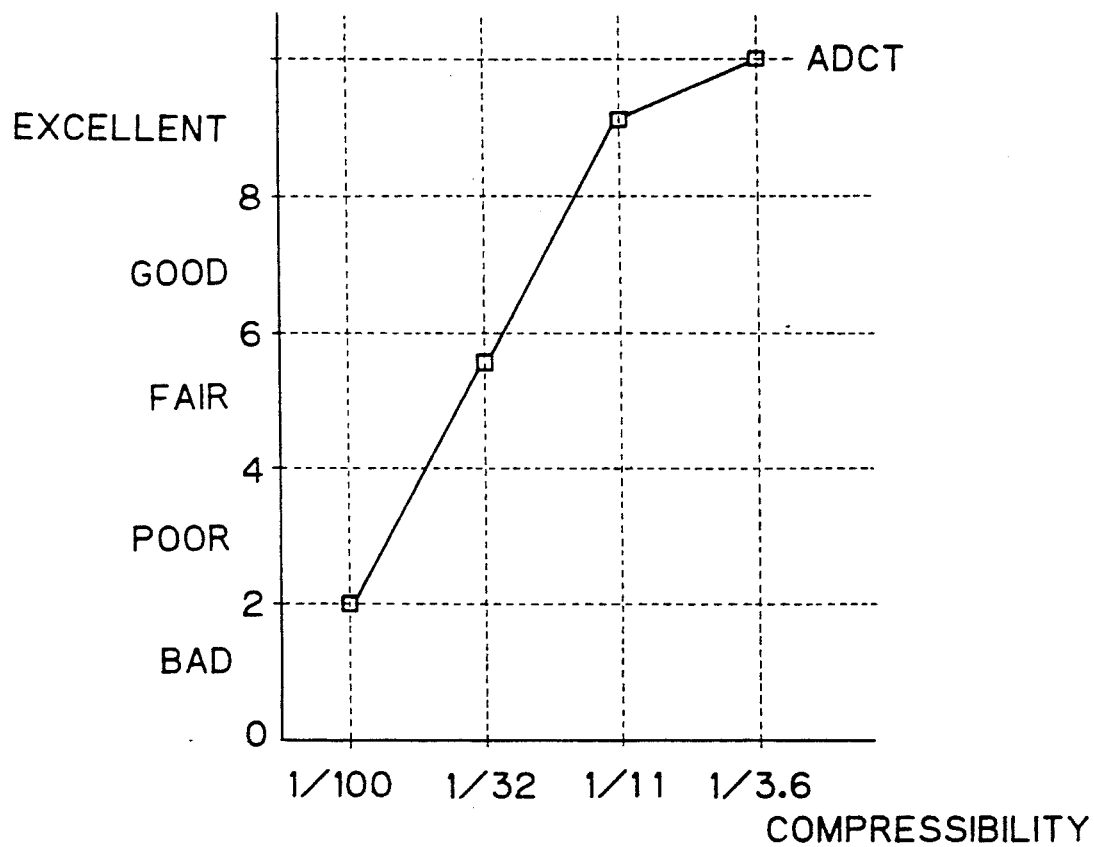
FIG. 25 is a graph showing a function for determining superiority and inferiority of the quality of a compressed image in the orthogonal transformation arithmetic unit shown in FIG. 24.

The compressibility detecting section 411 stores in advance functional information showing the relation between a compressibility value and an image quality as shown in FIG. 25. The compressibility detecting section 411 transmits a signal indicative of image quality information to an image quality display section 412 based on the above functional information at the compressibility value calculated on the basis of the above determined quantizing coefficient $\alpha$.

For example, the image quality display section 412 divides the image quality into five stages such as EXCELLENT, GOOD, FAIR, POOR and BAD based on the above image quality information signal. These stages are visually displayed for an operator by using a liquid crystal display or an LED display.

The above constructional portions relate to the storage of the photographed image.

An output-side of the memory section 6 is connected to a Huffman-decoding processing section 7 for decoding compressed data showing information of each of picture elements to picture element component data before data compression. The Huffman-decoding processing section 7 is connected to an inverse quantization processing section 8 for performing an inverse quantizing operation at the quantizing coefficient $\alpha$ transmitted from the compressibility detecting section 411. The inverse quantization processing section 8 is connected to an inverse DCT-processing section 9 for performing inverse DCT-processing with respect to quantized picture element data supplied from the inverse quantization processing section 8 to reproduce the original photographed image. The above constructional elements 1, 402, 3 to 9 have circuit constructions similar to those in the above general orthogonal transformation arithmetic unit.

The operation of the above orthogonal transformation arithmetic unit with respect to the color still image information will next be described. Operations of the above constructional elements 1, 402, 3 to 9 are similar to those in the above general orthogonal transformation arithmetic unit and an explanation thereof is therefore omitted in the following description except for a special case.

First, an operator sets the number of sheets of a photographed image recorded to the memory section 6 by the change-over switch 410. A signal indicative of the set number of sheets of the stored image is transmitted to the compressibility detecting section 411. The compressibility detecting section 411 calculates a memory capacity P required per one sheet of the stored image. The compressibility detecting section 411 further transmits a suitable value of the quantizing coefficient $\alpha$ to the quantization processing section 4.

Image information is converted to an electric signal by the charge coupled device 1 and is sequentially transmitted to the DCT-processing section 3. A control signal for performing the DCT-processing with respect to only image information of one block of one image in a central portion thereof is transmitted from the compressibility detecting section 411 to the DCT-processing section 3. Thus, the DCT-processing section 3 performs the DCT-processing with respect to the above image information of one block of the image in the central portion thereof. The central portion of the image is selected as a DCT-processed block since a focusing operation with respect to the photographed image is normally performed in the central image portion.

Image data $A_{ij}$ of the above one image block DCT-processed by the DCT-processing section 3 are transmitted to the quantization processing section 4. The quantization processing section 4 performs the quantizing operation by using the quantizing coefficient $\alpha$ transmitted from the compressibility detecting section 411 in accordance with the above-mentioned formula (5). Thus, the quantization processing section 4 transmits image component data $B_{ij}$ of the above one image block to the Huffman-coding processing section 5. The Huffman-coding processing section 5 performs the Huffman-coding operation with respect to the image information of the one image block and transmits an amount of compressed data to the compressibility detecting section 411.

The compressibility detecting section 411 judges whether or not a value of 5400 times the supplied compressed data amount is a greatest value within the above memory capacity P per one sheet of the image or is equal to this memory capacity P. When this condition is not satisfied, the quantizing coefficient $\alpha$ is set again and a reset value of the quantizing coefficient $\alpha$ is transmitted to the quantization processing section 4. The quantization processing section 4 again performs the quantizing processing at the reset value of the quantizing coefficient $\alpha$ with respect to the one block of the central image portion. The quantization processing section 4 transmits image component data $B_{ij}$ with respect to this reset value of the quantizing coefficient $\alpha$ to the Huffman-coding processing section 5. The Huffman-coding processing section 5 again performs the Huffman-coding processing with respect to this reset value and transmits an amount of compressed data to the compressibility detecting section 411. The compressibility detecting section 411 again performs the above-mentioned operation with respect to this reset value. Thus, the compressibility detecting section 411 calculates an optimum value of the quantizing coefficient $\alpha$. When the optimum value of the quantizing coefficient $\alpha$ is calculated, this optimum value of the quantizing coefficient $\alpha$ is transmitted from the compressibility detecting section 411 to the quantization processing section 4. The compressibility detecting section 411 also transmits a control signal for performing the DCT-processing with respect to all image data of the one sheet to the DCT-processing section 3. Further, the compressibility detecting section 411 calculates a compressibility from the above optimum value of the quantizing coefficient $\alpha$ and transmits a signal indicative of image quality information to the image quality display section 412. For example, when the compressibility is set to 1/7, the compressibility detecting section 411 transmits the image quality information signal corresponding to "EXCELLENT" as can be seen from FIG. 25.

Thus, for example, the image quality display section 412 visually displays a character of "EXCELLENT" based on the above image quality information signal. Accordingly, an operator can use this displayed character as a guide for determining the quality of the next photographed image. For example, when the image quality can be reduced, the operator can switch the change-over switch 410 to a contact for increasing the number of sheets of the stored image.

The quantization processing section 4 sequentially performs the quantizing processing with respect to image data of all the blocks of one photographed image every image block based on the above optimum value of the quantizing coefficient $\alpha$. The quantization processing section 4 then transmits image component data $B_{ij}$ every image block to the Huffman-coding processing section 5. Similar to the above-mentioned case, the Huffman-coding processing section 5 performs the Huffman-coding processing every image block and sequentially transmits and stores compressed data to the memory section 6.

When the image stored to the memory section 6 is reproduced, the compressed data read out of the memory section 6 are decoded by the Huffman-decoding processing section 7. Thereafter, the decoded data are inversely quantized by the inverse quantization processing section 8. At this time, a value of the quantizing coefficient $\alpha$ in the quantizing processing with respect to the reproduced image is transmitted to the inverse quantization processing section 8. Image data transmitted from the inverse quantization processing section 8 are reproduced as information of the original photographed image by the inverse DCT-processing section 9. This reproduced information of the photographed image is transmitted to a suitable unillustrated display unit so that it is possible to visually display the photographed image.

As mentioned above, the operator can select the number of sheets of an image stored to the memory section and the quality of the stored image can be changed by the number of sheets thereof. Further, it is possible to display superiority and inferiority of the image quality.

As mentioned above, the above orthogonal transformation arithmetic unit with respect to the color still image information can variably set the number of sheets of the stored photographed image to indirectly change the quantizing coefficient $\alpha$ which is not considered in the general arithmetic unit. Thus, it is possible to change the quality of the stored photographed image. Further, since the quality of the stored photographed image is displayed, the operator can know the quality of the stored photographed image in advance without reproducing the stored photographed image. For example, a clear image can be obtained if the number of sheets of this image can be set to a small number.

As mentioned above, in accordance with the present invention, a discrete cosine transformation is performed by performing adding and subtracting operations with respect to input data and using these added and subtracted data. Accordingly, it is possible to partially set some values of discrete cosine transformation coefficients to zero. Thus, it is possible to reduce the number of operations required to perform discrete cosine transformation processing. Accordingly, a time required to perform the discrete cosine transformation can be set to be equal to or shorter than a time required at a pre-stage until the discrete cosine transformation processing is performed with respect to a photographed image after a photographed time point. Accordingly, it is not necessary to store all image data with respect to one photographed image into a memory section for transmitting data to a section for performing the discrete cosine transformation processing. It is sufficient to store the image data of two line blocks into this memory section. Accordingly, it is possible to reduce the size of a circuit structure of the memory section and the size of an entire circuit device for compressing and extending data. Further, it is possible to provide an orthogonal transformation arithmetic unit cheaply manufactured without using an expensive page buffer.

Further, in accordance with the present invention, reducing and enlarging processings are simultaneously performed in inverse orthogonal transformation processing in a device for performing an orthogonal transformation such as DCT and an inverse orthogonal transformation thereof and coding and decoding an image. Accordingly, it is possible to realize an orthogonal transformation arithmetic unit having reducing and enlarging functions by a simplified structure and perform the reducing and enlarging processings at a high speed.

Further, in the present invention, the size of a DCT/inverse DCT processor can be reduced by executing DCT-processing and inverse DCT-processing by the same electric circuit.

Further, in the present invention, the number of sheets of the photographed image storable to the memory section having a constant memory capacity can be variably set. A quantizing coefficient can be changed in accordance with the set number of sheets of the photographed image. Accordingly, it is possible to change the quality of the stored photographed image in accordance with the change in quantizing coefficient, i.e., the set number of sheets of the photographed image. Further, a level of the image quality corresponding to a compressibility calculated in accordance with the quantizing coefficient can be predicted and displayed so that an operator can confirm the quality of the photographed image stored in accordance with the set number of sheets of the stored image before the photographed image is reproduced.

Many widely different embodiments of the present invention may be constructed without departing from the spirit and scope of the present invention. It should be understood that the present invention is not limited to the specific embodiments described in the specification, except as defined in the appended claims.

What is claimed is:

1. An orthogonal transformation arithmetic unit for performing a discrete cosine transformation with respect to a digital signal and compressing discrete cosine transformed data by quantizing and Huffman-coding processings thereof, said orthogonal transformation arithmetic unit Huffman-decoding the compressed data and demodulating the Huffman-decoded data to a digital signal by performing inverse quantization and an inverse discrete cosine transformation with respect to the Huffman-decoded data, said orthogonal transformation arithmetic unit comprising:

a memory section for storing one line block of image data of brightness and color signals converted to digital signals; and a section for processing the discrete cosine transformation and having a preprocessing circuit for performing adding and substracting operations with respect to the image data read out of said memory section such that some values of discrete cosine transformation coefficients used in the discrete cosine transformation are partially set to zero.

2. An orthogonal transformation arithmetic unit as claimed in claim 1, wherein the discrete cosine transformation processing section performs the discrete cosine transformation with respect to data obtained by performing the adding and subtracting operations about digitally converted data of the brightness and color signals supplied from the memory section.

3. An orthogonal transformation arithmetic unit for dividing one image into blocks including a plurality of picture elements, said orthogonal transformation arithmetic unit comprising:

an orthogonal transformation circuit for performing orthogonal transformation processing with respect to each of the blocks; and an inverse orthogonal transformation circuit for returning orthogonally transformed data to original image data;

said inverse orthogonal transformation circuit having a processing block having a variable size and selecting an inverse orthogonal transformation coefficient corresponding to a designated size of the processing block, said inverse orthogonal transformation circuit performing inverse orthogonal transformation processing with respect to the designated size of the processing block.

4. An orthogonal transformation arithmetic unit as claimed in claim 3, wherein the inverse orthogonal transformation circuit comprises multipliers for performing a multiplying operation with respect to input data and the inverse orthogonal transformation coefficient corresponding to the designated size of the processing block; a gate circuit for judging validation or invalidation of products of said respective multipliers corresponding to the designated size of the processing block; and an adder for adding the products of said multipliers validated by the gate circuit to each other so as to obtain one data.

5. An orthogonal transformation arithmetic unit for performing a discrete cosine transformation with respect to a digital signal and compressing discrete cosine transformed data by quantizing and Huffman-coding processings thereof, said orthogonal transformation arithmetic unit Huffman-decoding the compressed data and demodulating the Huffman-decoded data to a digital signal by performing inverse quantization and an inverse discrete cosine transformation with respect to the Huffman-decoded data, said orthogonal transformation arithmetic unit having a discrete cosine transformation/inverse discrete cosine transformation processing section for processing the discrete cosine transformation and the inverse discrete cosine transformation;

said discrete cosine transformation/inverse discrete cosine transformation processing section comprising:

a coefficient memory section for storing coefficients required to perform the discrete cosine transformation and the inverse discrete cosine transformation and transmitting one of said coefficients selected in accordance with a control signal indicative of the discrete cosine transformation or the inverse discrete cosine transformation;

a set of main arithmetic circuits for processing both the discrete cosine transformation and the inverse discrete cosine transformation by said transmitted coefficient and commonly used in both the processings of the discrete cosine transformation and the inverse discrete cosine transformation; and a section for selecting discrete cosine transformed data or inverse discrete cosine transformed data in accordance with said control signal.

6. An orthogonal transformation arithmetic unit of an adaptive discrete cosine transformation coding system for performing an orthogonal transformation with respect to information of a color still image using a discrete cosine transformation, said orthogonal transformation arithmetic unit comprising:

a change-over switch for setting the number of sheets of a photographed image storable to a memory section having a constant memory capacity;

a compressibility detecting section for automatically setting a quantizing coefficient used to compress an information amount of the photographed image until a predetermined image information amount in accordance with a signal indicative of the number of sheets of the photographed image transmitted from said change-over switch, said compressibility detecting section calculating a compressibility of the information amount and predicting a quality level of the stored photographed image based on said compressibility; and a display section for visually displaying a signal indicative of said image quality level transmitted from said compressibility detecting section.

7. An orthogonal transformation arithmetic unit as claimed in claim 6, wherein the compressibility detecting section arbitrarily sets the quantizing coefficient such that information of the number of sheets of the photographed image manually set by the change-over switch is stored to the memory section.

8. An orthogonal transformation arithmetic unit as claimed in claim 6, wherein the display section can display superiority and inferiority of the image quality.

* * * * *